United States Patent
Li et al.

(10) Patent No.: US 12,063,537 B2
(45) Date of Patent: Aug. 13, 2024

(54) MEASURING NR REFERENCE SIGNAL RECEIVE POWER (RSRP) BY OVER THE AIR SIGNALS

(71) Applicant: Apple Inc., Cupertino, CA (US)

(72) Inventors: Hua Li, Beijing (CN); Yang Tang, Santa Clara, CA (US); Jie Cui, Santa Clara, CA (US); Qiming Li, Beijing (CN); Andrey Chervyakov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 17/430,023

(22) PCT Filed: Feb. 13, 2020

(86) PCT No.: PCT/US2020/018187
§ 371 (c)(1),
(2) Date: Aug. 11, 2021

(87) PCT Pub. No.: WO2020/168127
PCT Pub. Date: Aug. 20, 2020

(65) Prior Publication Data
US 2022/0132349 A1    Apr. 28, 2022

Related U.S. Application Data

(60) Provisional application No. 62/805,542, filed on Feb. 14, 2019.

(51) Int. Cl.
*H04W 24/10*    (2009.01)
*H04B 7/0417*   (2017.01)
(Continued)

(52) U.S. Cl.
CPC .......... *H04W 24/10* (2013.01); *H04B 7/0417* (2013.01); *H04B 7/0617* (2013.01); *H04B 17/318* (2015.01); *H04L 5/0051* (2013.01)

(58) Field of Classification Search
CPC ... H04W 24/10; H04B 7/0417; H04B 7/0617; H04B 17/318; H04B 17/29; H04L 5/0051
See application file for complete search history.

(56) References Cited

U.S. PATENT DOCUMENTS 11,832,231 B2 *  11/2023  Cui .................. H04W 72/0453
2016/0105265 A1   4/2016  Wang et al.
(Continued)

FOREIGN PATENT DOCUMENTS

CN    104704872 A    6/2015
CN    105934966 A    9/2016

OTHER PUBLICATIONS

Huawei et al., Ad Hoc Minutes for NR RRM test cases; R4-1813732, China, Oct. 2018; 16 pages (Year: 2018).*
(Continued)

*Primary Examiner* — Hardikkumar D Patel
(74) *Attorney, Agent, or Firm* — Sterne, Kessler, Goldstein & Fox P.L.L.C.

(57) ABSTRACT

A method, system, and computer-readable media for evaluating the accuracy of user equipment (UE) reference signal receive power (RSRP) measurements is disclosed. This includes determining both a total reference signal receive power (RSRP) accuracy and a RSRP baseband accuracy associated with the UE. This also includes executing a plurality of comparisons between the total RSRP accuracy, the RSRP baseband accuracy, and a plurality of accuracy thresholds, and then determining the UE passes a measurement accuracy test based on the plurality of comparisons.

20 Claims, 13 Drawing Sheets

(51) Int. Cl.
  *H04B 7/06* (2006.01)
  *H04B 17/318* (2015.01)
  *H04L 5/00* (2006.01)

(56) References Cited

U.S. PATENT DOCUMENTS

| | | | |
|---|---|---|---|
| 2017/0019810 A1* | 1/2017 | Wu | H04L 5/14 |
| 2017/0048769 A1 | 2/2017 | Taylor | |
| 2019/0021021 A1 | 1/2019 | Thangarasa et al. | |
| 2019/0044631 A1* | 2/2019 | Davydov | H04B 17/382 |

OTHER PUBLICATIONS

International Search Report and Written Opinion of the International Searching Authority directed to related International Patent Application No. PCT/US2020/018187, mailed Jun. 8, 2020; 11 pages.

Huawei et al., 'Ad Hoc minutes for NR RRm test cases,' 3GPP Draft; R4-1813732, 3GPP TSG-RAN4 Meeting #88bis, Chengdu, China, Oct. 2018; 16 pages.

Huawei et al., 'Definitions of measurement reference point,' 3GPP Draft; R4-1713413, 3GPP TSSG-RAN WG4 Meeting #85, Reno, USA, Nov.-Dec. 2017; 5 pages.

* cited by examiner

MEASURING NR REFERENCE SIGNAL RECEIVE POWER (RSRP) BY OVER THE AIR SIGNALS

CROSS-REFERENCE TO RELATED APPLICATION

This application is a U.S. National Phase of International Application No. PCT/US2020/018187, filed Feb. 13, 2020, which claims priority under 35 U.S.C. § 119(e) to U.S. Provisional Application No. 62/805,542, filed on Feb. 14, 2019, both of which are hereby incorporated by reference in their entireties.

FIELD

Various embodiments generally may relate to the field of wireless communications.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target and meet vastly different and sometime conflicting performance dimensions and services. Such diverse multidimensional requirements are driven by different services and applications. In general, NR will evolve based on 3GPP LTE-Advanced with additional potential new Radio Access Technologies (RATs) to enrich people lives with better and seamless wireless connectivity solutions. NR will enable everything connected by wireless and deliver fast, rich content and services.

BRIEF SUMMARY

In general, one or more embodiments are directed to one or more computer-readable media (CRM) comprising instructions that, when executed by one or more processors, cause the one or more processors to determine a total reference signal receive power (RSRP) accuracy associated with a user equipment (UE) configured to operate on a wireless cellular network. Further, the instructions cause the processors to determine a RSRP baseband accuracy associated with the UE. Further still, the instructions cause the processors to execute a plurality of comparisons between the total RSRP accuracy, the RSRP baseband accuracy, and a plurality of accuracy thresholds, and then determine whether the UE passes a measurement accuracy test based on the plurality of comparisons.

In general, one or more embodiments are directed to a system. The system comprises processor circuitry coupled to a radio front end circuitry. The processor circuitry is configured to transmit one or more over the air (OTA) signals to a user equipment (UE) configured to operate on a wireless cellular network, and then receive feedback from the UE based on the OTA signals. Further, the processor circuitry is configured to determine both a total reference signal receive power (RSRP) accuracy and a RSRP baseband accuracy associated with UE based on the feedback. Further still, the processor circuitry is configured to execute a plurality of comparisons between the total RSRP accuracy, the RSRP baseband accuracy, and a plurality of accuracy thresholds, and then determine whether the UE passes a measurement accuracy test based on the plurality of comparisons.

In general, one or more embodiments are directed to a method. The method comprises determining a total reference signal receive power (RSRP) accuracy associated with a user equipment (UE) configured to operate on a wireless cellular network. Further, the method comprises determining a RSRP baseband accuracy associated with the UE. Further still, the method comprises executing a plurality of comparisons between the total RSRP accuracy, the RSRP baseband accuracy, and a plurality of accuracy thresholds, and then determining whether the UE passes a measurement accuracy test based on the plurality of comparisons.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Embodiments described herein may be directed to techniques, systems, apparatus, or the like for assessing the measurement accuracy of user equipment (UE), especially RSRP measurements taken by the UE in a wireless cellular network.

In one or more embodiments, for NR RSRP measurements above 6 GHz, an OTA (over the air) test will be applied. The difficultly is that the measured RSRP will include RF impairment, beamforming gain, as well as baseband inaccuracy. As a result, judging the accuracy of the RSPR is compromised.

Figure 1:
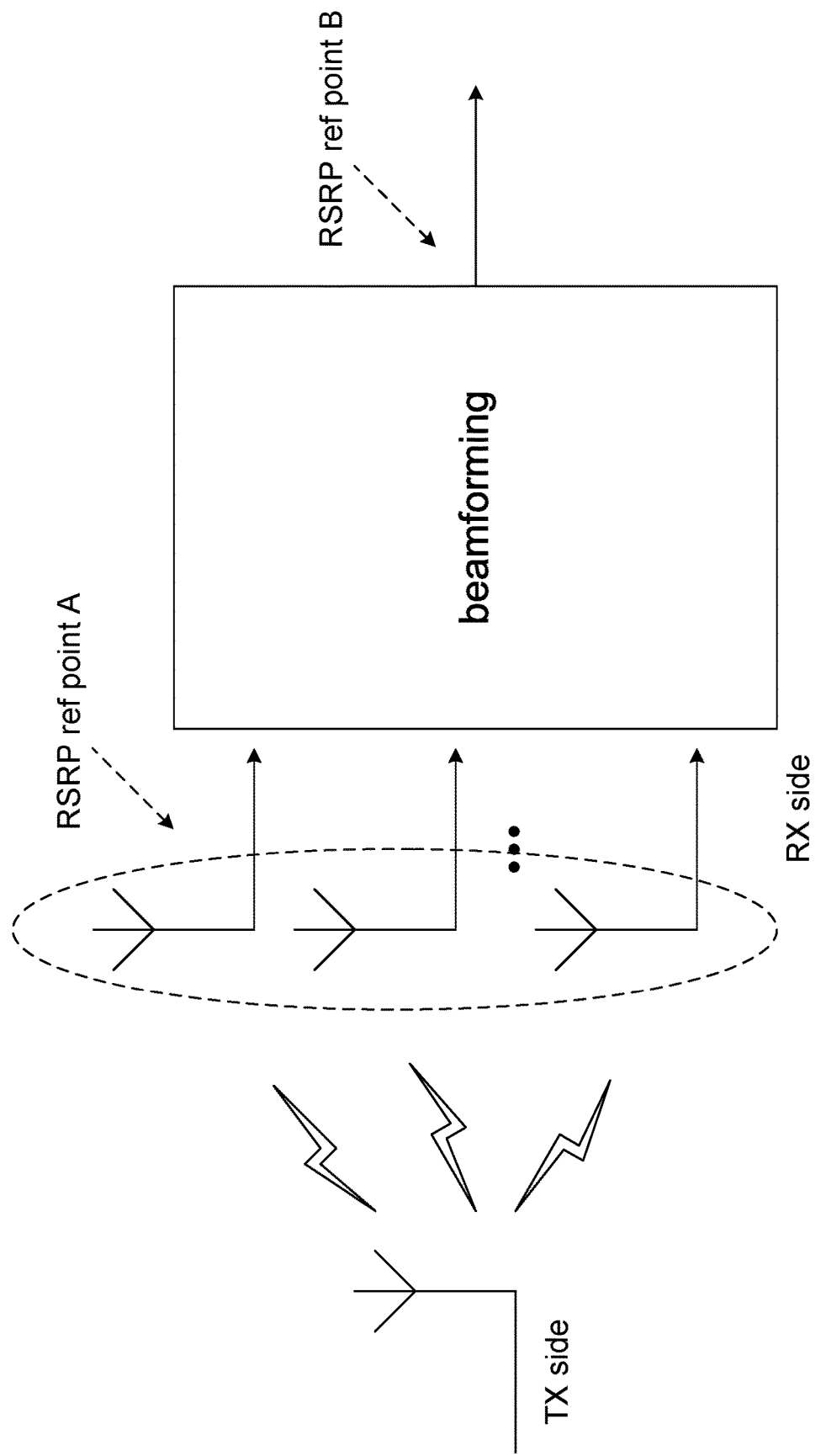
FIG. 1 illustrates RSRP reference points in accordance with one or more embodiments.

One method (Method A) for assessing the accuracy of the RSRP measurement is as follows. In order to test the measurement accuracy, the RSRP delta will be calculated based on a gap between Ideal RSRP and $RSRP_{BB}$. As shown in FIG. 1, the BB (baseband) RSRP can be derived as $RSRP_{BB}=RSRP_{RP}+G_{UE}+I_{LUE}$. Where $RSRP_{RP}$ is the RSRP at reference point A. $G_{UE}$ is antenna gain. $I_{LUE}$ is the RF implementation loss. Ideal RSRP is the RSRP at reference point A, which is known in advance. The UE will report the measured RSRP at reference point B. The RSRP delta can include factors, e.g., RF impairments, beamforming gain, and BB inaccuracy. In order to identify whether RSRP delta satisfy the measurement accuracy or not, both the RF impairments and beamforming gain range (minimum and maximum beamforming gain) needs to be clarified. After knowing the RF related factor parameters, the measurement accuracy can be checked. However, there is still some drawback based on this method. If $G_{UE}+I_{LUE}$ is very large, it's hard to judge whether the baseband measurement accuracy is sufficient or not. At the same time, a large delta of beamforming gain can be declared to compensate for the inaccuracy of baseband measurement.

An alternative method (Method B) for assessing the accuracy of the RSRP measurement is as follows. This method is a two-part RSRP test method that compensates for the drawback(s) of Method A.

In part 1, total RSRP accuracy including RF related loss is measured. The ideal RSRP at reference point A is known in advance. The UE will report the measured RSRP at reference point B. The delta RSRP range can be derived by the measured RSRP and ideal RSRP, including factors, e.g., RF impairments, beamforming gain, and BB inaccuracy. The RSRP delta should satisfy the accuracy requirements.

In part 2, the RSRP baseband accuracy is measured. Part 2 has three sub-parts: part 2.1, part 2.2, and part 2.3.

In part 2.1, the ideal RSRP at reference point B is calculated. Specifically, a reference signal with high power is sent out from Tx side. At reference point B as shown in FIG. 1, and RSRP is measured after beamforming, which is mainly signal power and can be considered as ideal RSRP.

In part 2.2, measured RSRP at reference point B is calculated. A reference signal and artificial noise is sent out from Tx side. The reference signal power in part 2.2 matches (i.e., equals or approximately equals) the reference signal power in part 2.1. RSRP is measured after beamforming. The measured RSRP includes reference signal power, artificial noise power and thermal noise power. In some embodiments, if thermal noise is very low, it can be omitted.

In part 2.3, RSRP delta is calculated. RSRP delta can be derived by the previous two parts (i.e., part 2.1 and part 2.2) where RSRP delta=measured RSRP−ideal RSRP.

In part 2.1 and part 2.2, both the ideal RSRP and measured RSRP may include RF error. However, since RSRP delta is the deduction of the two RSRP values, the RF impact can be cancelled. RSRP delta is the baseband inaccuracy.

The UE will pass the measurement accuracy test if only it passes the two parts simultaneously. Part 1 can guarantee that the RF impairment can be included. Part 2 can guarantee the baseband accuracy without considering the impact of large beamforming range.

Figure 2:
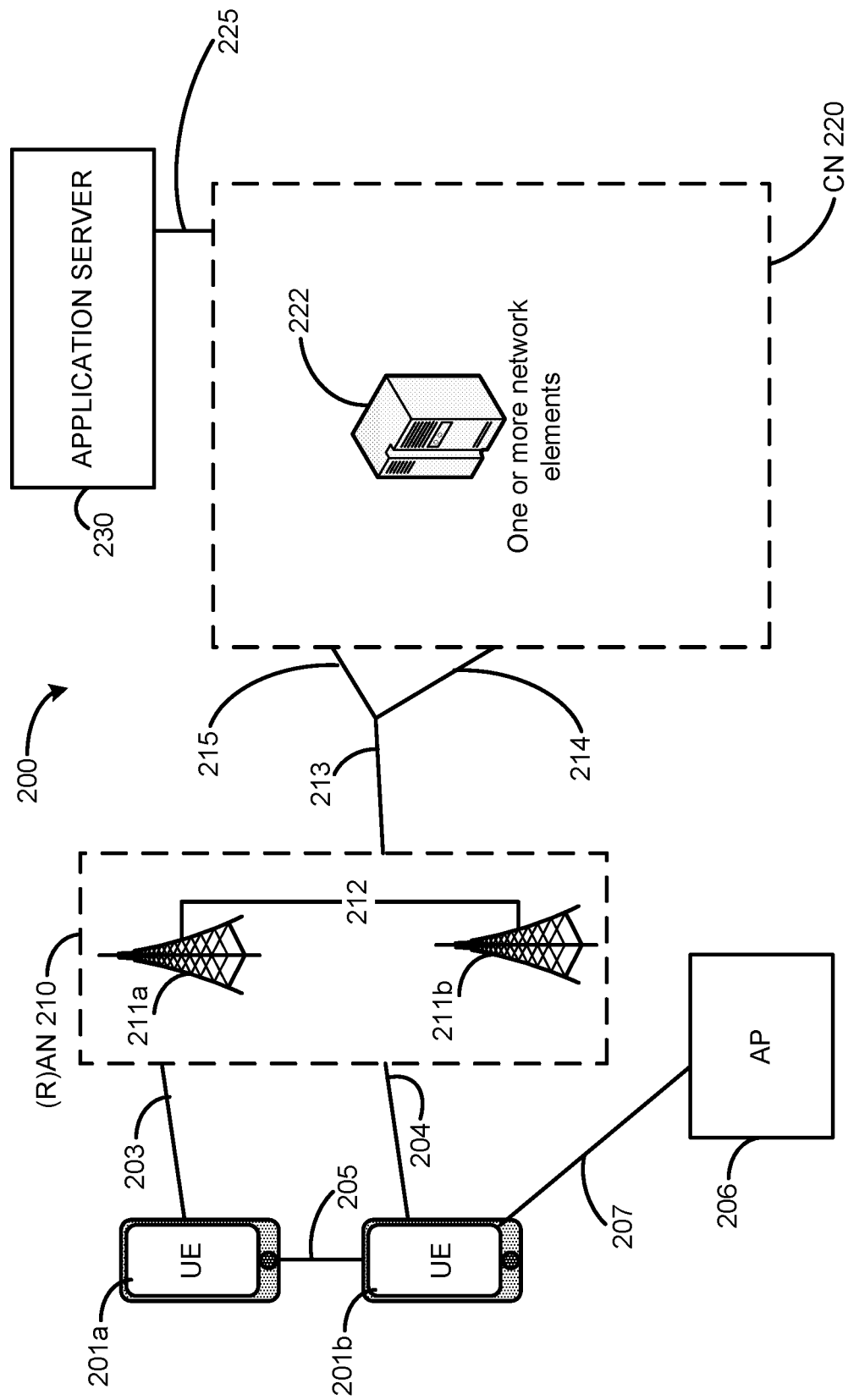
FIGS. 2, 3, and 4 illustrate example architectures of a system in accordance with one or more embodiments.

FIG. 2 illustrates an example architecture of a system 200 of a network, in accordance with various embodiments. The following description is provided for an example system 200 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 2, the system 200 includes UE 201a and UE 201b (collectively referred to as "UEs 201" or "UE 201"). In this example, UEs 201 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 201 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 201 may be configured to connect, for example, communicatively couple, with an or RAN 210. In embodiments, the RAN 210 may be an NG RAN or a 5G RAN, an E-UTRAN, or a legacy RAN, such as a UTRAN or GERAN. As used herein, the term "NG RAN" or the like may refer to a RAN 210 that operates in an NR or 5G system 200, and the term "E-UTRAN" or the like may refer to a RAN 210 that operates in an LTE or 4G system 200. The UEs 201 utilize connections (or channels) 203 and 204, respectively, each of which comprises a physical communications interface or layer (discussed in further detail below).

In this example, the connections 203 and 204 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 201 may directly exchange communication data via a ProSe interface 205. The ProSe interface 205 may alternatively be referred to as a SL interface 205 and may comprise one or more logical channels, including but not limited to a PSCCH, a PSSCH, a PSDCH, and a PSBCH.

The UE 201b is shown to be configured to access an AP 206 (also referred to as "WLAN node 206," "WLAN 206,"

"WLAN Termination 206," "WT 206" or the like) via connection 207. The connection 207 can comprise a local wireless connection, such as a connection consistent with any IEEE 802.11 protocol, wherein the AP 206 would comprise a wireless fidelity (Wi-Fi®) router. In this example, the AP 206 is shown to be connected to the Internet without connecting to the core network of the wireless system (described in further detail below). In various embodiments, the UE 201b, RAN 210, and AP 206 may be configured to utilize LWA operation and/or LWIP operation. The LWA operation may involve the UE 201b in RRC_CONNECTED being configured by a RAN node 211a-b to utilize radio resources of LTE and WLAN. LWIP operation may involve the UE 201b using WLAN radio resources (e.g., connection 207) via IPsec protocol tunneling to authenticate and encrypt packets (e.g., IP packets) sent over the connection 207. IPsec tunneling may include encapsulating the entirety of original IP packets and adding a new packet header, thereby protecting the original header of the IP packets.

The RAN 210 can include one or more AN nodes or RAN nodes 211a and 211b (collectively referred to as "RAN nodes 211" or "RAN node 211") that enable the connections 203 and 204. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 211 that operates in an NR or 5G system 200 (for example, a gNB), and the term "E-UTRAN node" or the like may refer to a RAN node 211 that operates in an LTE or 4G system 200 (e.g., an eNB). According to various embodiments, the RAN nodes 211 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 211 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 211; a MAC/PHY split wherein RRC, PDCP, RLC, and MAC layers are operated by the CRAN/vBBUP and the PHY layer is operated by individual RAN nodes 211; or a "lower PHY" split wherein RRC, PDCP, RLC, MAC layers and upper portions of the PHY layer are operated by the CRAN/vBBUP and lower portions of the PHY layer are operated by individual RAN nodes 211. This virtualized framework allows the freed-up processor cores of the RAN nodes 211 to perform other virtualized applications. In some implementations, an individual RAN node 211 may represent individual gNB-DUs that are connected to a gNB-CU via individual F1 interfaces (not shown by FIG. 2). In these implementations, the gNB-DUs may include one or more remote radio heads or RFEMs (see, e.g., FIG. 5), and the gNB-CU may be operated by a server that is located in the RAN 210 (not shown) or by a server pool in a similar manner as the CRAN/vBBUP. Additionally or alternatively, one or more of the RAN nodes 211 may be next generation eNBs (ng-eNBs), which are RAN nodes that provide E-UTRA user plane and control plane protocol terminations toward the UEs 201, and are connected to a 5GC (e.g., CN 420 of FIG. 4) via an NG interface (discussed infra).

In V2X scenarios one or more of the RAN nodes 211 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 201 (vUEs 201). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 211 can terminate the air interface protocol and can be the first point of contact for the UEs 201. In some embodiments, any of the RAN nodes 211 can fulfill various logical functions for the RAN 210 including, but not limited to, radio network controller (RNC) functions such as radio bearer management, uplink and downlink dynamic radio resource management and data packet scheduling, and mobility management.

In embodiments, the UEs 201 can be configured to communicate using OFDM communication signals with each other or with any of the RAN nodes 211 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 211 to the UEs 201, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 201, 202 and the RAN nodes 211, 212 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 201, 202 and the RAN nodes 211, 212 may operate using LAA, eLAA, and/or feLAA mechanisms. In these implementations, the UEs 201, 202 and the RAN nodes 211, 212 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 201, 202, RAN nodes 211, 212, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 201 or 202, AP 206, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 201, 202 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 201. The PDCCH carries information about the transport format and resource allocations related to the PDSCH channel, among other things. It may also inform the UEs 201 about the transport format, resource allocation, and HARQ information related to the uplink shared channel. Typically, downlink scheduling (assigning control and shared channel resource blocks to the UE 201b within a cell) may be performed at any of the RAN nodes 211 based on channel quality information fed back from any of the UEs 201. The downlink resource assignment information may be sent on the PDCCH used for (e.g., assigned to) each of the UEs 201.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs.

Similar to above, each ECCE may correspond to nine sets of four physical resource elements known as an EREGs. An ECCE may have other numbers of EREGs in some situations.

The RAN nodes 211 may be configured to communicate with one another via interface 212. In embodiments where the system 200 is an LTE system (e.g., when CN 220 is an EPC 320 as in FIG. 3), the interface 212 may be an X2 interface 212. The X2 interface may be defined between two or more RAN nodes 211 (e.g., two or more eNBs and the like) that connect to EPC 220, and/or between two eNBs connecting to EPC 220. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 201 from an SeNB for user data; information of PDCP PDUs that were not delivered to a UE 201; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 200 is a 5G or NR system (e.g., when CN 220 is an 5GC 420 as in FIG. 4), the interface 212 may be an Xn interface 212. The Xn interface is defined between two or more RAN nodes 211 (e.g., two or more gNBs and the like) that connect to 5GC 220, between a RAN node 211 (e.g., a gNB) connecting to 5GC 220 and an eNB, and/or between two eNBs connecting to 5GC 220. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 201 in a connected mode (e.g., CM-CONNECTED) including functionality to manage the UE mobility for connected mode between one or more RAN nodes 211. The mobility support may include context transfer from an old (source) serving RAN node 211 to new (target) serving RAN node 211; and control of user plane tunnels between old (source) serving RAN node 211 to new (target) serving RAN node 211. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 210 is shown to be communicatively coupled to a core network—in this embodiment, core network (CN) 220. The CN 220 may comprise a plurality of network elements 222, which are configured to offer various data and telecommunications services to customers/subscribers (e.g., users of UEs 201) who are connected to the CN 220 via the RAN 210. The components of the CN 220 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 220 may be referred to as a network slice, and a logical instantiation of a portion of the CN 220 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 230 may be an element offering applications that use IP bearer resources with the core network (e.g., UMTS PS domain, LTE PS data services, etc.). The application server 230 can also be configured to support one or more communication services (e.g., VoIP sessions, PTT sessions, group communication sessions, social networking services, etc.) for the UEs 201 via the EPC 220.

In embodiments, the CN 220 may be a 5GC (referred to as "5GC 220" or the like), and the RAN 210 may be connected with the CN 220 via an NG interface 213. In embodiments, the NG interface 213 may be split into two parts, an NG user plane (NG-U) interface 214, which carries traffic data between the RAN nodes 211 and a UPF, and the S1 control plane (NG-C) interface 215, which is a signaling interface between the RAN nodes 211 and AMFs. Embodiments where the CN 220 is a 5GC 220 are discussed in more detail with regard to FIG. 4.

In embodiments, the CN 220 may be a 5G CN (referred to as "5GC 220" or the like), while in other embodiments, the CN 220 may be an EPC). Where CN 220 is an EPC (referred to as "EPC 220" or the like), the RAN 210 may be connected with the CN 220 via an S1 interface 213. In embodiments, the S1 interface 213 may be split into two parts, an S1 user plane (S1-U) interface 214, which carries traffic data between the RAN nodes 211 and the S-GW, and the S1-MME interface 215, which is a signaling interface between the RAN nodes 211 and MMEs. An example architecture wherein the CN 220 is an EPC 220 is shown by FIG. 3.

Figure 3:
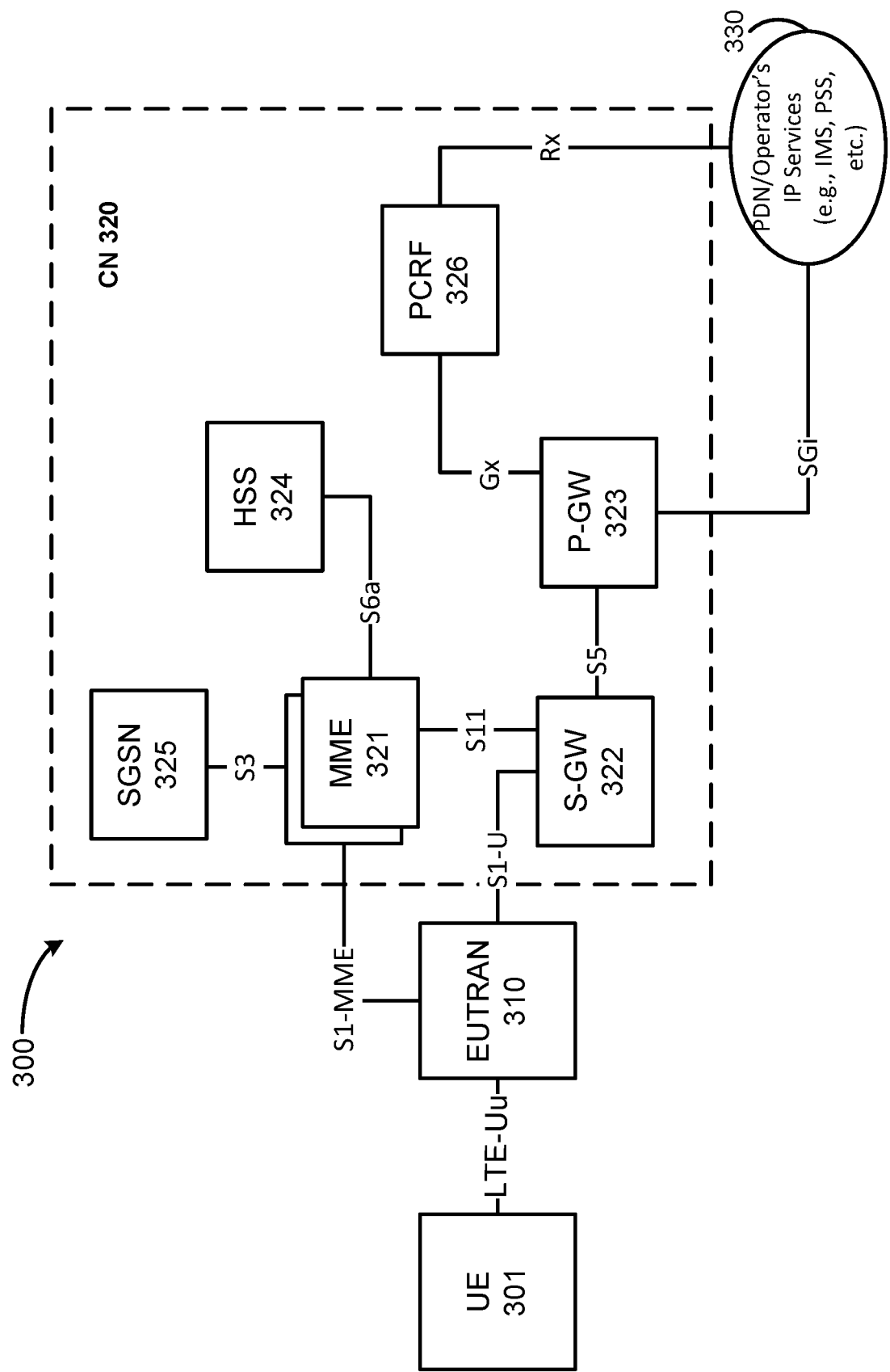

FIG. 3 illustrates an example architecture of a system 300 including a first CN 320, in accordance with various embodiments. In this example, system 300 may implement the LTE standard wherein the CN 320 is an EPC 320 that corresponds with CN 220 of FIG. 2. Additionally, the UE 301 may be the same or similar as the UEs 201 of FIG. 2, and the E-UTRAN 310 may be a RAN that is the same or similar to the RAN 210 of FIG. 2, and which may include RAN nodes 211 discussed previously. The CN 320 may comprise MMEs 321, an S-GW 322, a P-GW 323, a HSS 324, and a SGSN 325.

The MMEs 321 may be similar in function to the control plane of legacy SGSN, and may implement MM functions to keep track of the current location of a UE 301. The MMEs 321 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 301, provide user identity confidentiality, and/or perform other like services to users/subscribers. Each UE 301 and the MME 321 may include an MM or EMM sublayer, and an MM context may be established in the UE 301 and the MME 321 when an attach procedure is successfully completed. The MM context may be a data structure or database object that stores MM-related information of the UE 301. The MMEs 321 may be coupled with the HSS 324 via an S6a reference point, coupled with the SGSN 325 via an S3 reference point, and coupled with the S-GW 322 via an S11 reference point.

The SGSN 325 may be a node that serves the UE 301 by tracking the location of an individual UE 301 and performing security functions. In addition, the SGSN 325 may perform Inter-EPC node signaling for mobility between 2G/3G and E-UTRAN 3GPP access networks; PDN and S-GW selection as specified by the MMEs 321; handling of UE 301 time zone functions as specified by the MMEs 321; and MME selection for handovers to E-UTRAN 3GPP access network. The S3 reference point between the MMEs 321 and the SGSN 325 may enable user and bearer information exchange for inter-3GPP access network mobility in idle and/or active states.

The HSS 324 may comprise a database for network users, including subscription-related information to support the network entities' handling of communication sessions. The EPC 320 may comprise one or several HSSs 324, depending on the number of mobile subscribers, on the capacity of the equipment, on the organization of the network, etc. For example, the HSS 324 can provide support for routing/roaming, authentication, authorization, naming/addressing resolution, location dependencies, etc. An S6a reference point between the HSS 324 and the MMEs 321 may enable transfer of subscription and authentication data for authenticating/authorizing user access to the EPC 320 between HSS 324 and the MMEs 321.

The S-GW 322 may terminate the S1 interface 213 ("S1-U" in FIG. 3) toward the RAN 310, and routes data packets between the RAN 310 and the EPC 320. In addition, the S-GW 322 may be a local mobility anchor point for inter-RAN node handovers and also may provide an anchor for inter-3GPP mobility. Other responsibilities may include lawful intercept, charging, and some policy enforcement. The S11 reference point between the S-GW 322 and the MMEs 321 may provide a control plane between the MMEs 321 and the S-GW 322. The S-GW 322 may be coupled with the P-GW 323 via an S5 reference point.

The P-GW 323 may terminate an SGi interface toward a PDN 330. The P-GW 323 may route data packets between the EPC 320 and external networks such as a network including the application server 230 (alternatively referred to as an "AF") via an IP interface 225 (see e.g., FIG. 2). In embodiments, the P-GW 323 may be communicatively coupled to an application server (application server 230 of FIG. 2 or PDN 330 in FIG. 3) via an IP communications interface 225 (see, e.g., FIG. 2). The S5 reference point between the P-GW 323 and the S-GW 322 may provide user plane tunneling and tunnel management between the P-GW 323 and the S-GW 322. The S5 reference point may also be used for S-GW 322 relocation due to UE 301 mobility and if the S-GW 322 needs to connect to a non-collocated P-GW 323 for the required PDN connectivity. The P-GW 323 may further include a node for policy enforcement and charging data collection (e.g., PCEF (not shown)). Additionally, the SGi reference point between the P-GW 323 and the packet data network (PDN) 330 may be an operator external public, a private PDN, or an intra operator packet data network, for example, for provision of IMS services. The P-GW 323 may be coupled with a PCRF 326 via a Gx reference point.

PCRF 326 is the policy and charging control element of the EPC 320. In a non-roaming scenario, there may be a single PCRF 326 in the Home Public Land Mobile Network (HPLMN) associated with a UE 301's Internet Protocol Connectivity Access Network (IP-CAN) session. In a roaming scenario with local breakout of traffic, there may be two PCRFs associated with a UE 301's IP-CAN session, a Home PCRF (H-PCRF) within an HPLMN and a Visited PCRF (V-PCRF) within a Visited Public Land Mobile Network (VPLMN). The PCRF 326 may be communicatively coupled to the application server 330 via the P-GW 323. The application server 330 may signal the PCRF 326 to indicate a new service flow and select the appropriate QoS and charging parameters. The PCRF 326 may provision this rule into a PCEF (not shown) with the appropriate TFT and QCI, which commences the QoS and charging as specified by the application server 330. The Gx reference point between the PCRF 326 and the P-GW 323 may allow for the transfer of QoS policy and charging rules from the PCRF 326 to PCEF in the P-GW 323. An Rx reference point may reside between the PDN 330 (or "AF 330") and the PCRF 326.

Figure 4:
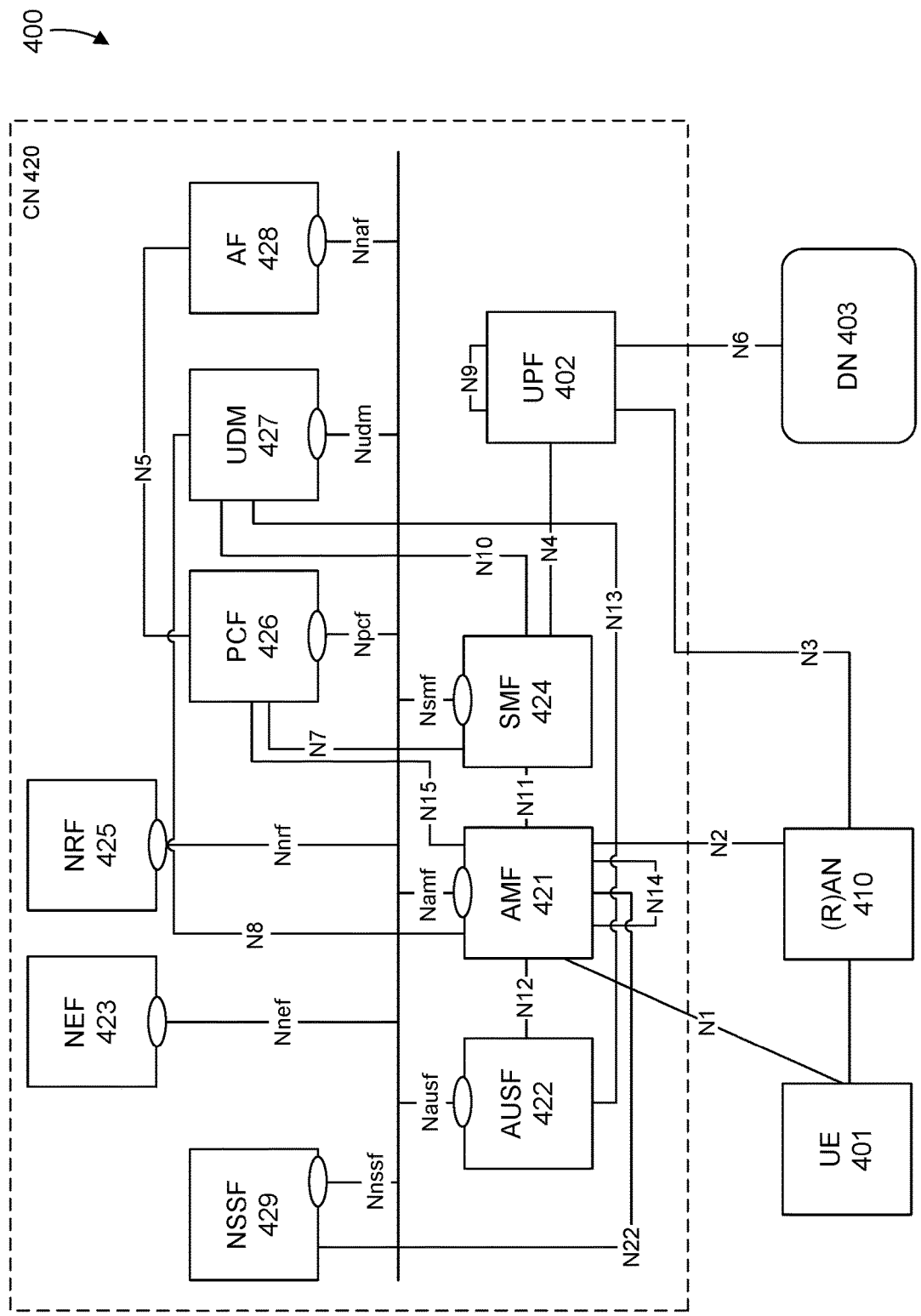

FIG. 4 illustrates an architecture of a system 400 including a second CN 420 in accordance with various embodiments. The system 400 is shown to include a UE 401, which may be the same or similar to the UEs 201 and UE 301 discussed previously; a (R)AN 410, which may be the same or similar to the RAN 210 and RAN 310 discussed previously, and which may include RAN nodes 211 discussed previously; and a DN 403, which may be, for example, operator services, Internet access or 3rd party services; and a 5GC 420. The 5GC 420 may include an AUSF 422; an AMF 421; a SMF 424; a NEF 423; a PCF 426; a NRF 425; a UDM 427; an AF 428; a UPF 402; and a NSSF 429.

The UPF 402 may act as an anchor point for intra-RAT and inter-RAT mobility, an external PDU session point of interconnect to DN 403, and a branching point to support multi-homed PDU session. The UPF 402 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 402 may include an uplink classifier to support routing traffic flows to a data network. The DN 403 may represent various network operator services, Internet access, or third party services. DN 403 may include, or be similar to, application server 230 discussed previously. The UPF 402 may interact with the SMF 424 via an N4 reference point between the SMF 424 and the UPF 402.

The AUSF 422 may store data for authentication of UE 401 and handle authentication-related functionality. The AUSF 422 may facilitate a common authentication framework for various access types. The AUSF 422 may communicate with the AMF 421 via an N12 reference point between the AMF 421 and the AUSF 422; and may communicate with the UDM 427 via an N13 reference point between the UDM 427 and the AUSF 422. Additionally, the AUSF 422 may exhibit an Nausf service-based interface.

The AMF 421 may be responsible for registration management (e.g., for registering UE 401, etc.), connection management, reachability management, mobility management, and lawful interception of AMF-related events, and access authentication and authorization. The AMF 421 may be a termination point for the an N11 reference point between the AMF 421 and the SMF 424. The AMF 421 may provide transport for SM messages between the UE 401 and the SMF 424, and act as a transparent proxy for routing SM messages. AMF 421 may also provide transport for SMS messages between UE 401 and an SMSF (not shown by FIG. 4). AMF 421 may act as SEAF, which may include interaction with the AUSF 422 and the UE 401, receipt of an intermediate key that was established as a result of the UE 401 authentication process. Where USIM based authentication is used, the AMF 421 may retrieve the security material from the AUSF 422. AMF 421 may also include a SCM function, which receives a key from the SEA that it uses to derive access-network specific keys. Furthermore, AMF 421 may be a termination point of a RAN CP interface, which may include or be an N2 reference point between the (R)AN 410 and the AMF 421; and the AMF 421 may be a termination point of NAS (N1) signalling, and perform NAS ciphering and integrity protection.

AMF 421 may also support NAS signalling with a UE 401 over an N3 IWF interface. The N3IWF may be used to provide access to untrusted entities. N3IWF may be a termination point for the N2 interface between the (R)AN 410 and the AMF 421 for the control plane, and may be a termination point for the N3 reference point between the (R)AN 410 and the UPF 402 for the user plane. As such, the AMF 421 may handle N2 signalling from the SMF 424 and the AMF 421 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 401 and AMF 421 via an N1 reference point between the UE 401 and the AMF 421, and relay uplink and downlink user-plane packets between the UE 401 and UPF 402. The N3IWF also provides mechanisms for IPsec tunnel establishment with the UE 401. The AMF 421 may exhibit an Namf service-based interface, and may be a termination point for an N14 reference point between two AMFs 421 and an N17 reference point between the AMF 421 and a 5G-EIR (not shown by FIG. 4).

The UE 401 may need to register with the AMF 421 in order to receive network services. RM is used to register or deregister the UE 401 with the network (e.g., AMF 421), and establish a UE context in the network (e.g., AMF 421). The UE 401 may operate in an RM-REGISTERED state or an RM-DEREGISTERED state. In the RM-DEREGISTERED state, the UE 401 is not registered with the network, and the UE context in AMF 421 holds no valid location or routing information for the UE 401 so the UE 401 is not reachable by the AMF 421. In the RM-REGISTERED state, the UE 401 is registered with the network, and the UE context in AMF 421 may hold a valid location or routing information for the UE 401 so the UE 401 is reachable by the AMF 421. In the RM-REGISTERED state, the UE 401 may perform mobility Registration Update procedures, perform periodic Registration Update procedures triggered by expiration of the periodic update timer (e.g., to notify the network that the UE 401 is still active), and perform a Registration Update procedure to update UE capability information or to re-negotiate protocol parameters with the network, among others.

The AMF 421 may store one or more RM contexts for the UE 401, where each RM context is associated with a specific access to the network. The RM context may be a data structure, database object, etc. that indicates or stores, inter alia, a registration state per access type and the periodic update timer. The AMF 421 may also store a 5GC MM context that may be the same or similar to the (E)MM context discussed previously. In various embodiments, the AMF 421 may store a CE mode B Restriction parameter of the UE 401 in an associated MM context or RM context. The AMF 421 may also derive the value, when needed, from the UE's usage setting parameter already stored in the UE context (and/or MM/RM context).

CM may be used to establish and release a signaling connection between the UE 401 and the AMF 421 over the N1 interface. The signaling connection is used to enable NAS signaling exchange between the UE 401 and the CN 420, and comprises both the signaling connection between the UE and the AN (e.g., RRC connection or UE-N3IWF connection for non-3GPP access) and the N2 connection for the UE 401 between the AN (e.g., RAN 410) and the AMF 421. The UE 401 may operate in one of two CM states, CM-IDLE mode or CM-CONNECTED mode. When the UE 401 is operating in the CM-IDLE state/mode, the UE 401 may have no NAS signaling connection established with the AMF 421 over the N1 interface, and there may be (R)AN 410 signaling connection (e.g., N2 and/or N3 connections) for the UE 401. When the UE 401 is operating in the CM-CONNECTED state/mode, the UE 401 may have an established NAS signaling connection with the AMF 421 over the N1 interface, and there may be a (R)AN 410 signaling connection (e.g., N2 and/or N3 connections) for the UE 401. Establishment of an N2 connection between the (R)AN 410 and the AMF 421 may cause the UE 401 to transition from CM-IDLE mode to CM-CONNECTED mode, and the UE 401 may transition from the CM-CONNECTED mode to the CM-IDLE mode when N2 signaling between the (R)AN 410 and the AMF 421 is released.

The SMF 424 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 401 and a data network (DN) 403 identified by a Data Network Name (DNN). PDU sessions may be established upon UE 401 request, modified upon UE 401 and 5GC 420 request, and released upon UE 401 and 5GC 420 request using NAS SM signaling exchanged over the N1 reference point between the UE 401 and the SMF 424. Upon request from an application server, the 5GC 420 may trigger a specific application in the UE 401. In response to receipt of the trigger message, the UE 401 may pass the trigger message (or relevant parts/information of the trigger message) to one or more identified applications in the UE 401. The identified application(s) in the UE 401 may establish a PDU session to a specific DNN. The SMF 424 may check whether the UE 401 requests are compliant with user subscription information associated with the UE 401. In this regard, the SMF 424 may retrieve and/or request to receive update notifications on SMF 424 level subscription data from the UDM 427.

The SMF 424 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 424 may be included in the system 400, which may be between another SMF 424 in a visited network and the SMF 424 in the home network in roaming scenarios. Additionally, the SMF 424 may exhibit the Nsmf service-based interface.

The NEF 423 may provide means for securely exposing the services and capabilities provided by 3GPP network functions for third party, internal exposure/re-exposure, Application Functions (e.g., AF 428), edge computing or fog computing systems, etc. In such embodiments, the NEF 423 may authenticate, authorize, and/or throttle the AFs. NEF 423 may also translate information exchanged with the AF 428 and information exchanged with internal network functions. For example, the NEF 423 may translate between an AF-Service-Identifier and an internal 5GC information. NEF 423 may also receive information from other network functions (NFs) based on exposed capabilities of other network functions. This information may be stored at the NEF 423 as structured data, or at a data storage NF using standardized interfaces. The stored information can then be re-exposed by the NEF 423 to other NFs and AFs, and/or used for other purposes such as analytics. Additionally, the NEF 423 may exhibit an Nnef service-based interface.

The NRF 425 may support service discovery functions, receive NF discovery requests from NF instances, and provide the information of the discovered NF instances to the NF instances. NRF 425 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 425 may exhibit the Nnrf service-based interface.

The PCF 426 may provide policy rules to control plane function(s) to enforce them, and may also support unified policy framework to govern network behaviour. The PCF 426 may also implement an FE to access subscription information relevant for policy decisions in a UDR of the UDM 427. The PCF 426 may communicate with the AMF 421 via an N15 reference point between the PCF 426 and the AMF 421, which may include a PCF 426 in a visited network and the AMF 421 in case of roaming scenarios. The PCF 426 may communicate with the AF 428 via an N5 reference point between the PCF 426 and the AF 428; and with the SMF 424 via an N7 reference point between the PCF 426 and the SMF 424. The system 400 and/or CN 420 may also include an N24 reference point between the PCF 426 (in the home network) and a PCF 426 in a visited network. Additionally, the PCF 426 may exhibit an Npcf service-based interface.

The UDM 427 may handle subscription-related information to support the network entities' handling of communication sessions, and may store subscription data of UE 401. For example, subscription data may be communicated between the UDM 427 and the AMF 421 via an N8 reference point between the UDM 427 and the AMF. The UDM 427 may include two parts, an application FE and a UDR (the FE and UDR are not shown by FIG. 4). The UDR may store subscription data and policy data for the UDM 427 and the PCF 426, and/or structured data for exposure and application data (including PFDs for application detection, application request information for multiple UEs 401) for the NEF 423. The Nudr service-based interface may be exhibited by the UDR 221 to allow the UDM 427, PCF 426, and NEF 423 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 424 via an N10 reference point between the UDM 427 and the SMF 424. UDM 427 may also support SMS management, wherein an SMS-FE implements the similar application logic as discussed previously. Additionally, the UDM 427 may exhibit the Nudm service-based interface.

The AF 428 may provide application influence on traffic routing, provide access to the NCE, and interact with the policy framework for policy control. The NCE may be a mechanism that allows the 5GC 420 and AF 428 to provide information to each other via NEF 423, which may be used for edge computing implementations. In such implementations, the network operator and third party services may be hosted close to the UE 401 access point of attachment to achieve an efficient service delivery through the reduced end-to-end latency and load on the transport network. For edge computing implementations, the 5GC may select a UPF 402 close to the UE 401 and execute traffic steering from the UPF 402 to DN 403 via the N6 interface. This may be based on the UE subscription data, UE location, and information provided by the AF 428. In this way, the AF 428 may influence UPF (re)selection and traffic routing. Based on operator deployment, when AF 428 is considered to be a trusted entity, the network operator may permit AF 428 to interact directly with relevant NFs. Additionally, the AF 428 may exhibit an Naf service-based interface.

The NSSF 429 may select a set of network slice instances serving the UE 401. The NSSF 429 may also determine allowed NSSAI and the mapping to the subscribed S-NSSAIs, if needed. The NSSF 429 may also determine the AMF set to be used to serve the UE 401, or a list of candidate AMF(s) 421 based on a suitable configuration and possibly by querying the NRF 425. The selection of a set of network slice instances for the UE 401 may be triggered by the AMF 421 with which the UE 401 is registered by interacting with the NSSF 429, which may lead to a change of AMF 421. The NSSF 429 may interact with the AMF 421 via an N22 reference point between AMF 421 and NSSF 429; and may communicate with another NSSF 429 in a visited network via an N31 reference point (not shown by FIG. 4). Additionally, the NSSF 429 may exhibit an Nnssf service-based interface.

As discussed previously, the CN 420 may include an SMSF, which may be responsible for SMS subscription checking and verification, and relaying SM messages to/from the UE 401 to/from other entities, such as an SMS-GMSC/IWMSC/SMS-router. The SMS may also interact with AMF 421 and UDM 427 for a notification procedure that the UE 401 is available for SMS transfer (e.g., set a UE not reachable flag, and notifying UDM 427 when UE 401 is available for SMS).

The CN 120 may also include other elements that are not shown by FIG. 4, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 4). Individual NFs may share a UDSF for storing their respective unstructured data or individual NFs may each have their own UDSF located at or near the individual NFs. Additionally, the UDSF may exhibit an Nudsf service-based interface (not shown by FIG. 4). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 4 for clarity. In one example, the CN 420 may include an Nx interface, which is an inter-CN interface between the MME (e.g., MME 321) and the AMF 421 in order to enable interworking between CN 420 and CN 320. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 5:
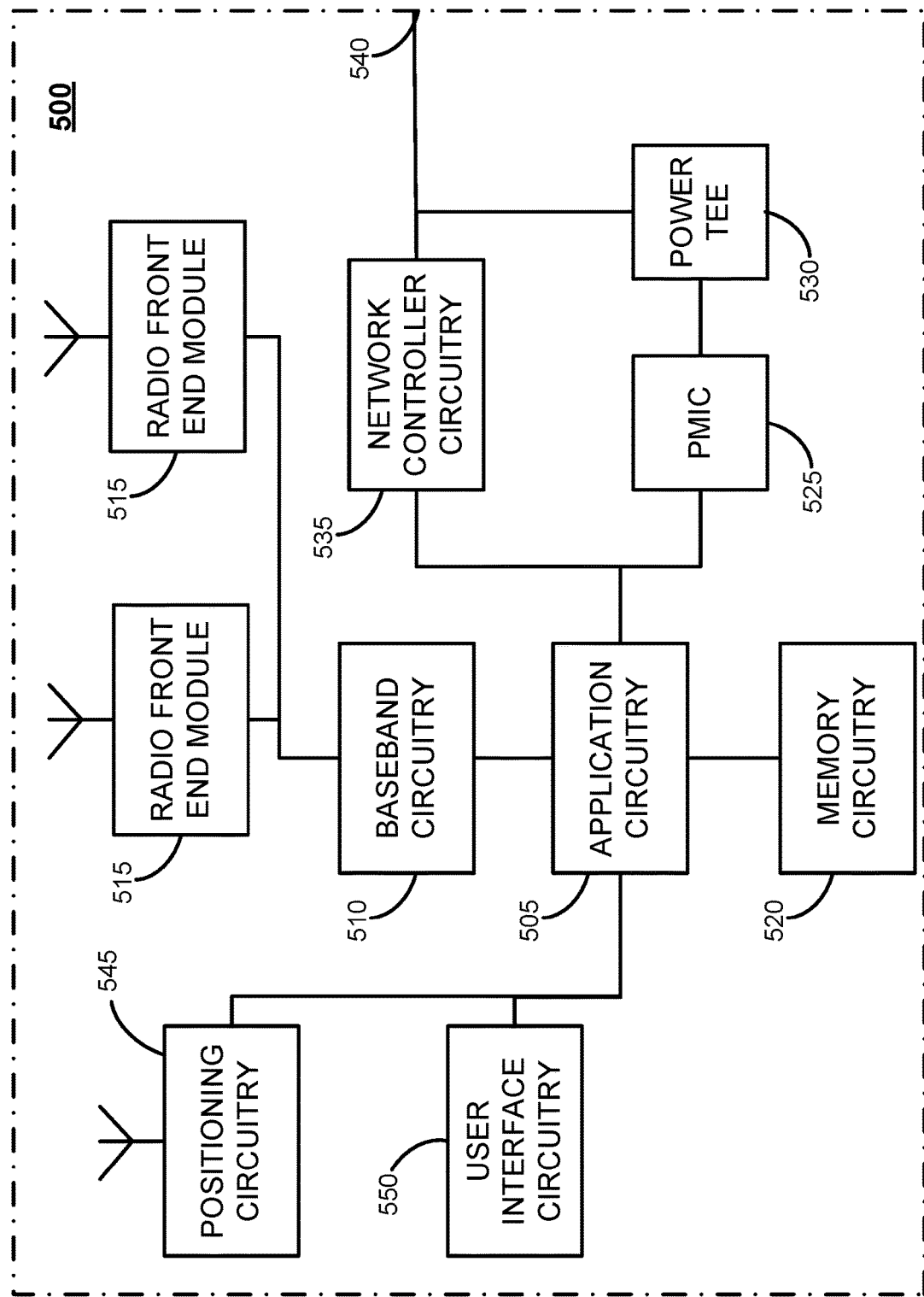
FIG. 5 illustrates example infrastructure equipment in accordance with one or more embodiments.

FIG. 5 illustrates an example of infrastructure equipment 500 in accordance with various embodiments. The infrastructure equipment 500 (or "system 500") may be implemented as a base station, radio head, RAN node such as the RAN nodes 211 and/or AP 206 shown and described previously, application server(s) 230, and/or any other element/device discussed herein. In other examples, the system 500 could be implemented in or by a UE.

The system 500 includes application circuitry 505, baseband circuitry 510, one or more radio front end modules (RFEMs) 515, memory circuitry 520, power management integrated circuitry (PMIC) 525, power tee circuitry 530, network controller circuitry 535, network interface connector 540, satellite positioning circuitry 545, and user interface circuitry 550. In some embodiments, the device 500 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 505 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 505 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 505 may comprise, or may be, a special-purpose processor/controller to operate according to the various embodiments herein. As examples, the processor(s) of application circuitry 505 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 500 may not utilize application circuitry 505, and instead may include a special-purpose processor/controller to process IP data received from an EPC or 5GC, for example.

In some implementations, the application circuitry 505 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 505 may comprise logic blocks or logic fabric, and other interconnected resources that may be programmed to perform various functions, such as the procedures, methods, functions, etc. of the various embodiments discussed herein. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed infra with regard to FIG. 7.

User interface circuitry 550 may include one or more user interfaces designed to enable user interaction with the system 500 or peripheral component interfaces designed to enable peripheral component interaction with the system 500. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative implementations, both mmWave and sub-mmWave radio functions may be implemented in the same physical RFEM 515, which incorporates both mmWave antennas and sub-mmWave.

The memory circuitry 520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAIVI), etc., and may incorporate the three-dimensional (3D) cross-point (XPOINT) memories from Intel® and Micron®. Memory circuitry 520 may be implemented as one or more of solder down packaged integrated circuits, socketed memory modules and plug-in memory cards.

The PMIC 525 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 530 may provide for electrical power drawn from a network cable to provide both power supply and data connectivity to the infrastructure equipment 500 using a single cable.

The network controller circuitry 535 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 500 via network interface connector 540 using a physical connection, which may be electrical (commonly referred to as a "copper interconnect"), optical, or wireless. The network controller circuitry 535 may include one or more dedicated processors and/or FPGAs to communicate using one or more of the aforementioned protocols. In some implementations, the network controller circuitry 535 may include multiple controllers to provide connectivity to other networks using the same or different protocols.

The positioning circuitry 545 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 545 may include a Micro-Technology for Positioning, Navigation, and Timing (Micro-PNT) IC that uses a master timing clock to perform position tracking/estimation without GNSS assistance. The positioning circuitry 545 may also be part of, or interact with, the baseband circuitry 510 and/or RFEMs 515 to communicate with the nodes and components of the positioning network. The positioning circuitry 545 may also provide position data and/or time data to the application circuitry 505, which may use the data to synchronize operations with various infrastructure (e.g., RAN nodes 211, etc.), or the like.

The components shown by FIG. 5 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an $I^2C$ interface, an SPI interface, point to point interfaces, and a power bus, among others.

Figure 6:
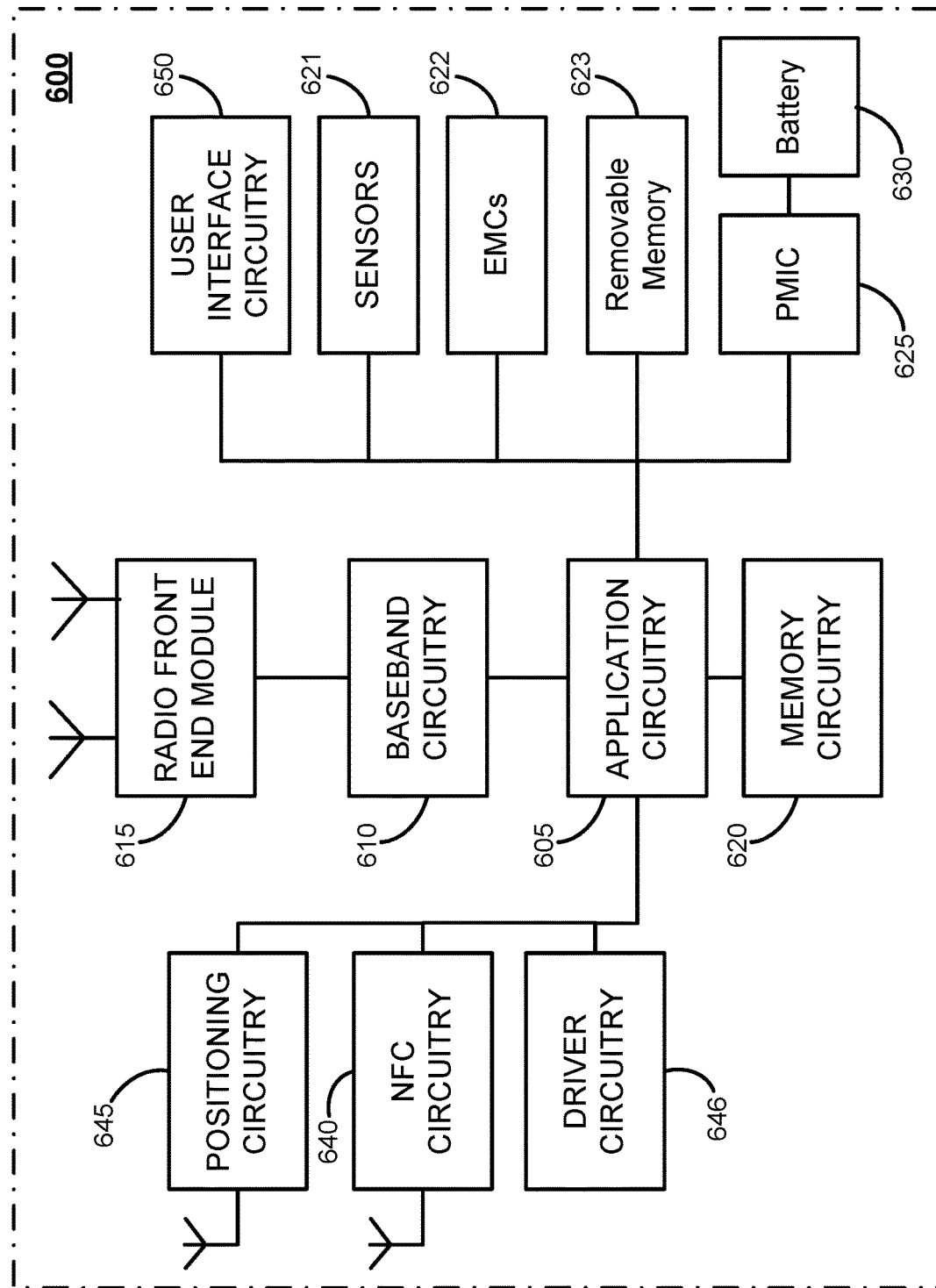
FIG. 6 illustrates an example platform in accordance with one or more embodiments.

FIG. 6 illustrates an example of a platform 600 (or "device 600") in accordance with various embodiments. In embodiments, the computer platform 600 may be suitable for use as UEs 201, 202, 301, application servers 230, and/or any other element/device discussed herein. The platform 600 may include any combinations of the components shown in the example. The components of platform 600 may be implemented as integrated circuits (ICs), portions thereof, discrete electronic devices, or other modules, logic, hardware, software, firmware, or a combination thereof adapted in the computer platform 600, or as components otherwise incorporated within a chassis of a larger system. The block diagram of FIG. 6 is intended to show a high level view of components of the computer platform 600. However, some of the components shown may be omitted, additional components may be present, and different arrangement of the components shown may occur in other implementations.

Application circuitry 605 includes circuitry such as, but not limited to one or more processors (or processor cores), cache memory, and one or more of LDOs, interrupt controllers, serial interfaces such as SPI, $I^2C$ or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or nonvolatile memory, such as DRAM, SRAM, EPROM, EEPROM, Flash memory, solid-state memory, and/or any other type of memory device technology, such as those discussed herein.

The processor(s) of application circuitry 505 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 505 may comprise, or may be, a special-purpose processor/controller to operate according to the various embodiments herein.

As examples, the processor(s) of application circuitry 605 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 605 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 605 may be a part of a system on a chip (SoC) in which the application circuitry 605 and other components are formed into a single integrated circuit, or a single package, such as the Edison™ or Galileo™ SoC boards from Intel® Corporation.

Additionally or alternatively, application circuitry 605 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 610 are discussed infra with regard to FIG. 7.

The RFEMs 615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative implementations, both mmWave and sub-mmWave radio functions may be implemented in the same physical RFEM 615, which incorporates both mmWave antennas and sub-mmWave.

The memory circuitry 620 may include any number and type of memory devices used to provide for a given amount of system memory. As examples, the memory circuitry 620 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 620 may be developed in accordance with a Joint Electron Devices Engineering Council (JEDEC) low power double data rate (LPDDR)-based design, such as LPDDR2, LPDDR3, LPDDR4, or the like. Memory circuitry 620 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 620 may be on-die memory or registers associated with the application circuitry 605. To provide for persistent storage of information such as data, applications, operating systems and so forth, memory circuitry 620 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 600 may incorporate the three-dimensional (3D) cross-point (XPOINT) memories from Intel® and Micron®.

Removable memory circuitry 623 may include devices, circuitry, enclosures/housings, ports or receptacles, etc. used to couple portable data storage devices with the platform 600. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 600 may also include interface circuitry (not shown) that is used to connect external devices with the platform 600. The external devices connected to the platform 600 via the interface circuitry include sensor circuitry 621 and electro-mechanical components (EMCs) 622, as well as removable memory devices coupled to removable memory circuitry 623.

The sensor circuitry 621 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 622 include devices, modules, or subsystems whose purpose is to enable platform 600 to change its state, position, and/or orientation, or move or control a mechanism or (sub)system. Additionally, EMCs 622 may be configured to generate and send messages/signalling to other components of the platform 600 to indicate a current state of the EMCs 622. Examples of the EMCs 622 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 600 is configured to operate one or more EMCs 622 based on one or more captured events and/or instructions or control signals received from a service provider and/or various clients.

In some implementations, the interface circuitry may connect the platform 600 with positioning circuitry 645. The positioning circuitry 645 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-PNT IC that uses a master timing clock to perform position tracking/estimation without GNSS assistance. The positioning circuitry 645 may also be part of, or interact with, the baseband circuitry 510 and/or RFEMs 615 to communicate with the nodes and components of the positioning network. The positioning circuitry 645 may also provide position data and/or time data to the application circuitry 605, which may use the data to synchronize operations with various infrastructure (e.g., radio base stations), for turn-by-turn navigation applications, or the like In some implementations, the interface circuitry may connect the platform 600 with Near-Field Communication (NFC) circuitry 640. NFC circuitry 640 is configured to provide contactless, short-range communications based on radio frequency identification (RFID) standards, wherein magnetic field induction is used to enable communication between NFC circuitry 640 and NFC-enabled devices external to the platform 600 (e.g., an "NFC touchpoint"). NFC circuitry 640 comprises an NFC controller coupled with an antenna element and a processor coupled with the NFC controller. The NFC controller may be a chip/IC providing NFC functionalities to the NFC circuitry 640 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 640, or initiate data transfer between the NFC circuitry 640 and another active NFC device (e.g., a smartphone or an NFC-enabled POS terminal) that is proximate to the platform 600.

The driver circuitry 646 may include software and hardware elements that operate to control particular devices that are embedded in the platform 600, attached to the platform 600, or otherwise communicatively coupled with the platform 600. The driver circuitry 646 may include individual drivers allowing other components of the platform 600 to interact with or control various input/output (I/O) devices that may be present within, or connected to, the platform 600. For example, driver circuitry 646 may include a display driver to control and allow access to a display device, a touchscreen driver to control and allow access to a touchscreen interface of the platform 600, sensor drivers to obtain sensor readings of sensor circuitry 621 and control and allow access to sensor circuitry 621, EMC drivers to obtain actuator positions of the EMCs 622 and/or control and allow access to the EMCs 622, a camera driver to control and allow access to an embedded image capture device, audio drivers to control and allow access to one or more audio devices.

The power management integrated circuitry (PMIC) 625 (also referred to as "power management circuitry 625") may manage power provided to various components of the platform 600. In particular, with respect to the baseband circuitry 610, the PMIC 625 may control power-source selection, voltage scaling, battery charging, or DC-to-DC conversion. The PMIC 625 may often be included when the platform 600 is capable of being powered by a battery 630, for example, when the device is included in a UE 201, 202, 301.

In some embodiments, the PMIC 625 may control, or otherwise be part of, various power saving mechanisms of the platform 600. For example, if the platform 600 is in an RRC_Connected state, where it is still connected to the RAN node as it expects to receive traffic shortly, then it may enter a state known as Discontinuous Reception Mode (DRX) after a period of inactivity. During this state, the platform 600 may power down for brief intervals of time and thus save power. If there is no data traffic activity for an extended period of time, then the platform 600 may transition off to an RRC Idle state, where it disconnects from the network and does not perform operations such as channel quality feedback, handover, etc. The platform 600 goes into a very low power state and it performs paging where again it periodically wakes up to listen to the network and then powers down again. The platform 600 may not receive data in this state; in order to receive data, it may transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 630 may power the platform 600, although in some examples the platform 600 may be mounted deployed in a fixed location, and may have a power supply coupled to an electrical grid. The battery 630 may be a lithium ion battery, a metal-air battery, such as a zinc-air battery, an aluminum-air battery, a lithium-air battery, and the like. In some implementations, such as in V2X applications, the battery 630 may be a typical lead-acid automotive battery.

In some implementations, the battery 630 may be a "smart battery," which includes or is coupled with a Battery Management System (BMS) or battery monitoring integrated circuitry. The BMS may be included in the platform 600 to track the state of charge (SoCh) of the battery 630. The BMS may be used to monitor other parameters of the battery 630 to provide failure predictions, such as the state of health (SoH) and the state of function (SoF) of the battery 630. The BMS may communicate the information of the battery 630 to the application circuitry 605 or other components of the platform 600. The BMS may also include an analog-to-digital (ADC) convertor that allows the application circuitry 605 to directly monitor the voltage of the battery 630 or the current flow from the battery 630. The battery parameters may be used to determine actions that the platform 600 may perform, such as transmission frequency, network operation, sensing frequency, and the like.

A power block, or other power supply coupled to an electrical grid may be coupled with the BMS to charge the battery 630. In some examples, the power block may be replaced with a wireless power receiver to obtain the power wirelessly, for example, through a loop antenna in the computer platform 600. In these examples, a wireless battery charging circuit may be included in the BMS. The specific charging circuits chosen may depend on the size of the battery 630, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 650 includes various input/output (I/O) devices present within, or connected to, the platform 600, and includes one or more user interfaces designed to enable user interaction with the platform 600 and/or peripheral component interfaces designed to enable peripheral component interaction with the platform 600. The user interface circuitry 650 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 600. The output device circuitry may also include speakers or other audio emitting devices, printer(s), and/or the like. In some embodiments, the sensor circuitry 621 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 600 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an $I^2C$ interface, an SPI interface, point-to-point interfaces, and a power bus, among others.

Figure 7:
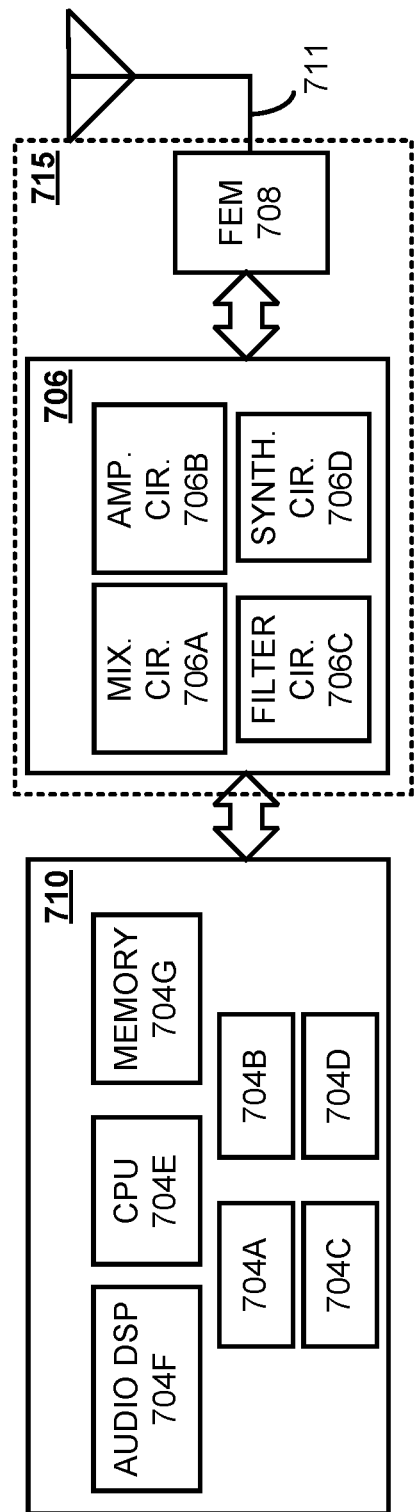
FIG. 7 illustrates example components of baseband circuitry and radio front end modules (RFEM) in accordance with one or more embodiments.

FIG. 7 illustrates example components of baseband circuitry 710 and radio front end modules (RFEM) 715 in accordance with various embodiments. The baseband circuitry 710 corresponds to the baseband circuitry 510 and 610 of FIGS. 5 and 6, respectively. The RFEM 715 corresponds to the RFEM 515 and 615 of FIGS. 5 and 6, respectively. As shown, the RFEMs 715 may include Radio Frequency (RF) circuitry 706, front-end module (FEM) circuitry 708, antenna array 711 coupled together at least as shown.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with application circuitry 505/605 (see FIGS. 5 and 6) for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a 3G baseband processor 704A, a 4G/LTE baseband processor 704B, a 5G/NR baseband processor 704C, or some other baseband processor(s) 704D for other existing generations, generations in development or to be developed in the future (e.g., sixth generation (6G), etc.). In other embodiments, some or all of the functionality of baseband processors 704A-D may be included in modules stored in the memory 704G and executed via a Central Processing Unit (CPU) 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real-time OS (RTOS), which when executed by the CPU 704E (or other baseband processor), is to cause the CPU 704E (or other baseband processor) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 710 includes one or more audio digital signal processor(s) (DSP) 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices, such as an interface to send/receive data to/from memory external to the baseband circuitry 710; an application circuitry interface to send/receive data to/from the application circuitry 505/605 of FIGS. 5-7); an RF circuitry interface to send/receive data to/from RF circuitry 706 of FIG. 7; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 625.

In alternate embodiments (which may be combined with the above described embodiments), baseband circuitry 710 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

Although not shown by FIG. 7, in some embodiments, the baseband circuitry 710 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 710 and/or RF circuitry 706 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 710 and/or RF circuitry 706 are part of a Wi-Fi communication system. In the second example, the protocol processing circuitry would operate Wi-Fi MAC and logical link control (LLC) functions. The protocol processing circuitry may include one or more memory structures (e.g., 704G) to store program code and data for operating the protocol functions, as well as one or more processing cores to execute the program code and perform various operations using the data. The baseband circuitry 710 may also support radio communications for more than one wireless protocol.

The various hardware elements of the baseband circuitry 710 discussed herein may be implemented, for example, as a solder-down substrate including one or more integrated circuits (ICs), a single packaged IC soldered to a main circuit board or a multi-chip module containing two or more ICs. In one example, the components of the baseband circuitry 710 may be suitably combined in a single chip or chipset, or disposed on a same circuit board. In another example, some or all of the constituent components of the baseband circuitry 710 and RF circuitry 706 may be implemented together such as, for example, a system on a chip (SoC) or System-in-Package (SiP). In another example, some or all of the constituent components of the baseband circuitry 710 may be implemented as a separate SoC that is communicatively coupled with and RF circuitry 706 (or multiple instances of RF circuitry 706). In yet another example, some or all of the constituent components of the baseband circuitry 710 and the application circuitry 505/605 may be implemented together as individual SoCs mounted to a same circuit board (e.g., a "multi-chip package").

In some embodiments, the baseband circuitry 710 may provide for communication compatible with one or more radio technologies. For example, in some embodiments, the baseband circuitry 710 may support communication with an E-UTRAN or other WMAN, a WLAN, a WPAN. Embodiments in which the baseband circuitry 710 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path, which may include circuitry to down-convert RF signals received from the FEM circuitry 708 and provide baseband signals to the baseband circuitry 710. RF circuitry 706 may also include a transmit signal path, which may include circuitry to up-convert baseband signals provided by the baseband circuitry 710 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 710 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 710 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 710 or the application circuitry 505/605 depending on the desired output frequency. In some embodiments, a divider control input (e.g., N) may be determined from a look-up table based on a channel indicated by the application circuitry 505/605.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission by one or more antenna elements of the antenna array 711.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. The antenna array 711 may comprise microstrip antennas or printed antennas that are fabricated on the surface of one or more printed circuit boards. The antenna array 711 may be formed in as a patch of metal foil (e.g., a patch antenna) in a variety of shapes, and may be coupled with the RF circuitry 706 and/or FEM circuitry 708 using metal transmission lines or the like.

Processors of the application circuitry 505/605 and processors of the baseband circuitry 710 may be used to execute elements of one or more instances of a protocol stack. For example, processors of the baseband circuitry 710, alone or in combination, may be used execute Layer 3, Layer 2, or Layer 1 functionality, while processors of the application circuitry 505/605 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 8:
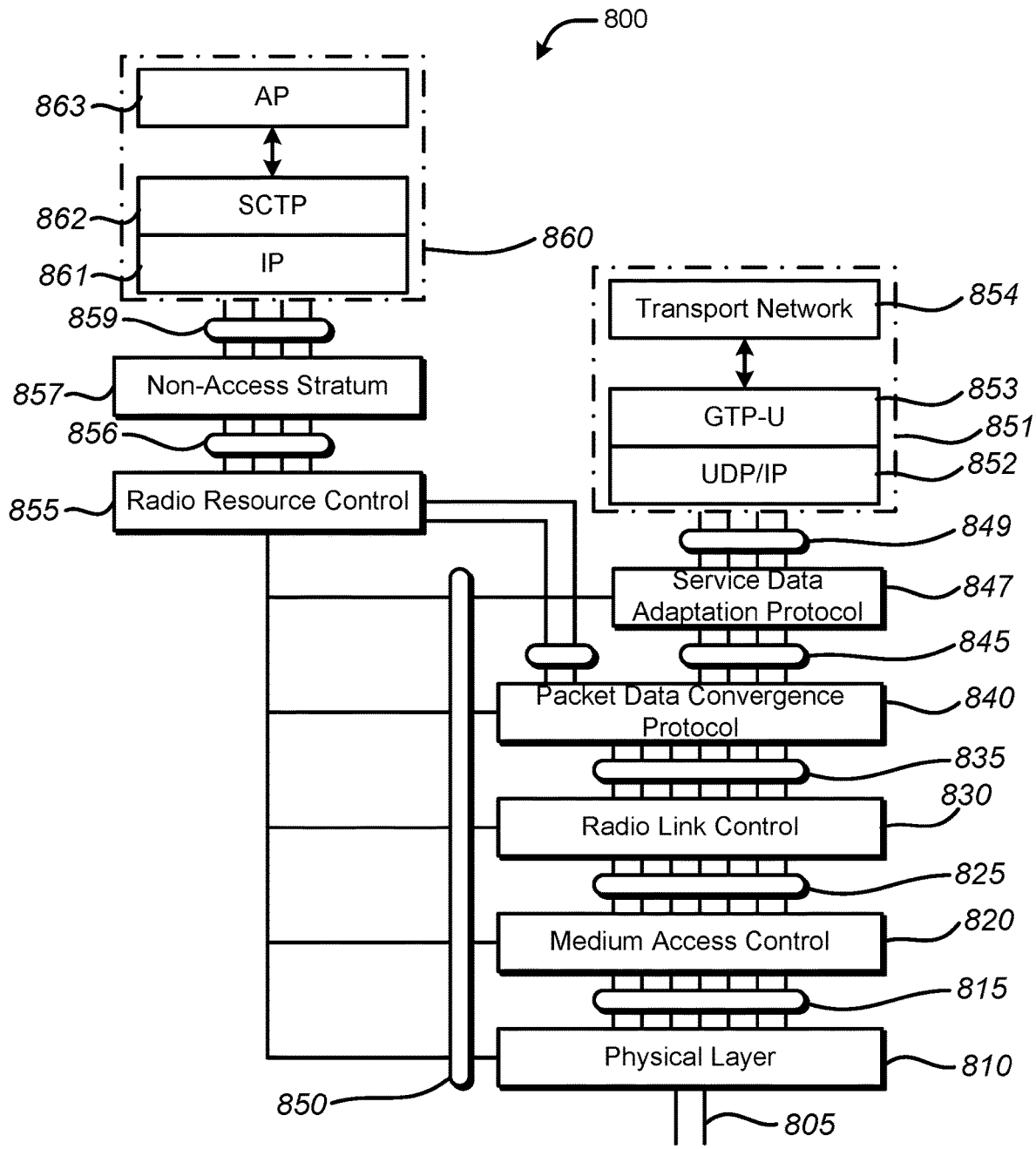
FIG. 8 illustrates various protocol functions that may be implemented in a wireless communication device in accordance with one or more embodiments.

FIG. 8 illustrates various protocol functions that may be implemented in a wireless communication device according to various embodiments. In particular, FIG. 8 includes an arrangement 800 showing interconnections between various protocol layers/entities. The following description of FIG. 8 is provided for various protocol layers/entities that operate in conjunction with the 5G/NR system standards and LTE system standards, but some or all of the aspects of FIG. 8 may be applicable to other wireless communication network systems as well.

The protocol layers of arrangement 800 may include one or more of PHY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may comprise one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 810 may process requests from and provide indications to an instance of MAC 820 via one or more PHY-SAP 815. According to some embodiments, requests and indications communicated via PHY-SAP 815 may comprise one or more transport channels.

Instance(s) of MAC 820 may process requests from, and provide indications to, an instance of RLC 830 via one or more MAC-SAPs 825. These requests and indications communicated via the MAC-SAP 825 may comprise one or more logical channels. The MAC 820 may perform mapping between the logical channels and transport channels, multiplexing of MAC SDUs from one or more logical channels onto TBs to be delivered to PHY 810 via the transport channels, de-multiplexing MAC SDUs to one or more logical channels from TBs delivered from the PHY 810 via transport channels, multiplexing MAC SDUs onto TBs, scheduling information reporting, error correction through HARQ, and logical channel prioritization.

Instance(s) of RLC 830 may process requests from and provide indications to an instance of PDCP 840 via one or more radio link control service access points (RLC-SAP) 835. These requests and indications communicated via RLC-SAP 835 may comprise one or more RLC channels. The RLC 830 may operate in a plurality of modes of operation, including: Transparent Mode™, Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 and/or instance(s) of SDAP 847 via one or more packet data convergence protocol service access points (PDCP-SAP) 845. These requests and indications communicated via PDCP-SAP 845 may comprise one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 847 may process requests from and provide indications to one or more higher layer protocol entities via one or more SDAP-SAP 849. These requests and indications communicated via SDAP-SAP 849 may comprise one or more QoS flows. The SDAP 847 may map QoS flows to DRBs, and vice versa, and may also mark QFIs in DL and UL packets. A single SDAP entity 847 may be configured for an individual PDU session. In the UL direction, the NG-RAN 210 may control the mapping of QoS Flows to DRB(s) in two different ways, reflective mapping or explicit mapping. For reflective mapping, the SDAP 847 of a UE 201 may monitor the QFIs of the DL packets for each DRB, and may apply the same mapping for packets flowing in the UL direction. For a DRB, the SDAP 847 of the UE 201 may map the UL packets belonging to the QoS flows(s) corresponding to the QoS flow ID(s) and PDU session observed in the DL packets for that DRB. To enable reflective mapping, the NG-RAN 410 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In embodiments, the SDAP 847 may only be used in NR implementations and may not be used in LTE implementations.

The RRC 855 may configure, via one or more management service access points (M-SAP), aspects of one or more protocol layers, which may include one or more instances of PHY 810, MAC 820, RLC 830, PDCP 840 and SDAP 847. In embodiments, an instance of RRC 855 may process requests from and provide indications to one or more NAS entities 857 via one or more RRC-SAPs 856. The main services and functions of the RRC 855 may include broadcast of system information (e.g., included in MIBs or SIBs related to the NAS), broadcast of system information related to the access stratum (AS), paging, establishment, maintenance and release of an RRC connection between the UE 201 and RAN 210 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 857 may form the highest stratum of the control plane between the UE 201 and the AMF 421. The NAS 857 may support the mobility of the UEs 201 and the session management procedures to establish and maintain IP connectivity between the UE 201 and a P-GW in LTE systems.

According to various embodiments, one or more protocol entities of arrangement 800 may be implemented in UEs 201, RAN nodes 211, AMF 421 in NR implementations or MME 321 in LTE implementations, UPF 402 in NR implementations or S-GW 322 and P-GW 323 in LTE implementations, or the like to be used for control plane or user plane communications protocol stack between the aforementioned devices. In such embodiments, one or more protocol entities that may be implemented in one or more of UE 201, gNB 211, AMF 421, etc. may communicate with a respective peer protocol entity that may be implemented in or on another device using the services of respective lower layer protocol entities to perform such communication. In some embodiments, a gNB-CU of the gNB 211 may host the RRC 855, SDAP 847, and PDCP 840 of the gNB that controls the operation of one or more gNB-DUs, and the gNB-DUs of the gNB 211 may each host the RLC 830, MAC 820, and PHY 810 of the gNB 211.

In a first example, a control plane protocol stack may comprise, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In NR implementations, the AP 863 may be an NG application protocol layer (NGAP or NG-AP) 863 for the NG interface 213 defined between the NG-RAN node 211 and the AMF 421, or the AP 863 may be an Xn application protocol layer (XnAP or Xn-AP) 863 for the Xn interface 212 that is defined between two or more RAN nodes 211.

The NG-AP 863 may support the functions of the NG interface 213 and may comprise Elementary Procedures (EPs). An NG-AP EP may be a unit of interaction between the NG-RAN node 211 and the AMF 421. The NG-AP 863 services may comprise two groups: UE-associated services (e.g., services related to a UE 201, 202) and non-UE-associated services (e.g., services related to the whole NG interface instance between the NG-RAN node 211 and AMF 421). These services may include functions including, but not limited to: a paging function for the sending of paging requests to NG-RAN nodes 211 involved in a particular paging area; a UE context management function for allowing the AMF 421 to establish, modify, and/or release a UE context in the AMF 421 and the NG-RAN node 211; a mobility function for UEs 201 in ECM-CONNECTED mode for intra-system HOs to support mobility within NG-RAN and inter-system HOs to support mobility from/to EPS systems; a NAS Signaling Transport function for transporting or rerouting NAS messages between UE 201 and AMF 421; a NAS node selection function for determining an association between the AMF 421 and the UE 201; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 211 via CN 220; and/or other like functions.

The XnAP 863 may support the functions of the Xn interface 212 and may comprise XnAP basic mobility procedures and XnAP global procedures. The XnAP basic mobility procedures may comprise procedures used to handle UE mobility within the NG RAN 211 (or E-UTRAN 310), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 201, such as Xn interface setup and reset procedures, NG-RAN update procedures, cell activation procedures, and the like.

In LTE implementations, the AP 863 may be an S1 Application Protocol layer (S1-AP) 863 for the S1 interface 213 defined between an E-UTRAN node 211 and an MME, or the AP 863 may be an X2 application protocol layer (X2AP or X2-AP) 863 for the X2 interface 212 that is defined between two or more E-UTRAN nodes 211.

The S1 Application Protocol layer (S1-AP) 863 may support the functions of the S1 interface, and similar to the NG-AP discussed previously, the S1-AP may comprise S1-AP EPs. An S1-AP EP may be a unit of interaction between the E-UTRAN node 211 and an MME 321 within an LTE CN 220. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 212 and may comprise X2AP basic mobility procedures and X2AP global procedures. The X2AP basic mobility procedures may comprise procedures used to handle UE mobility within the E-UTRAN 220, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 201, such as X2 interface setup and reset procedures, load indication procedures, error indication procedures, cell activation procedures, and the like.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 211 and the AMF 421/MME 321 based, in part, on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 211 may comprise L2 and L1 layer communication links (e.g., wired or wireless) with the MME/AMF to exchange information.

In a second example, a user plane protocol stack may comprise, in order from highest layer to lowest layer, SDAP 847, PDCP 840, RLC 830, MAC 820, and PHY 810. The user plane protocol stack may be used for communication between the UE 201, the RAN node 211, and UPF 402 in NR implementations or an S-GW 322 and P-GW 323 in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 211 and the S-GW 322 may utilize an S1-U interface to exchange user plane data via a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 322 and the P-GW 323 may utilize an S5/S8a interface to exchange user plane data via a protocol stack comprising an L1 layer, an L2 layer, the UDP/IP layer 852, and the GTP-U 853. As discussed previously, NAS protocols may support the mobility of the UE 201 and the session management procedures to establish and maintain IP connectivity between the UE 201 and the P-GW 323.

Moreover, although not shown by FIG. 8, an application layer may be present above the AP 863 and/or the transport network layer 854. The application layer may be a layer in which a user of the UE 201, RAN node 211, or other network element interacts with software applications being executed, for example, by application circuitry 505 or application circuitry 605, respectively. The application layer may also provide one or more interfaces for software applications to interact with communications systems of the UE 201 or RAN node 211, such as the baseband circuitry 710. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 9:
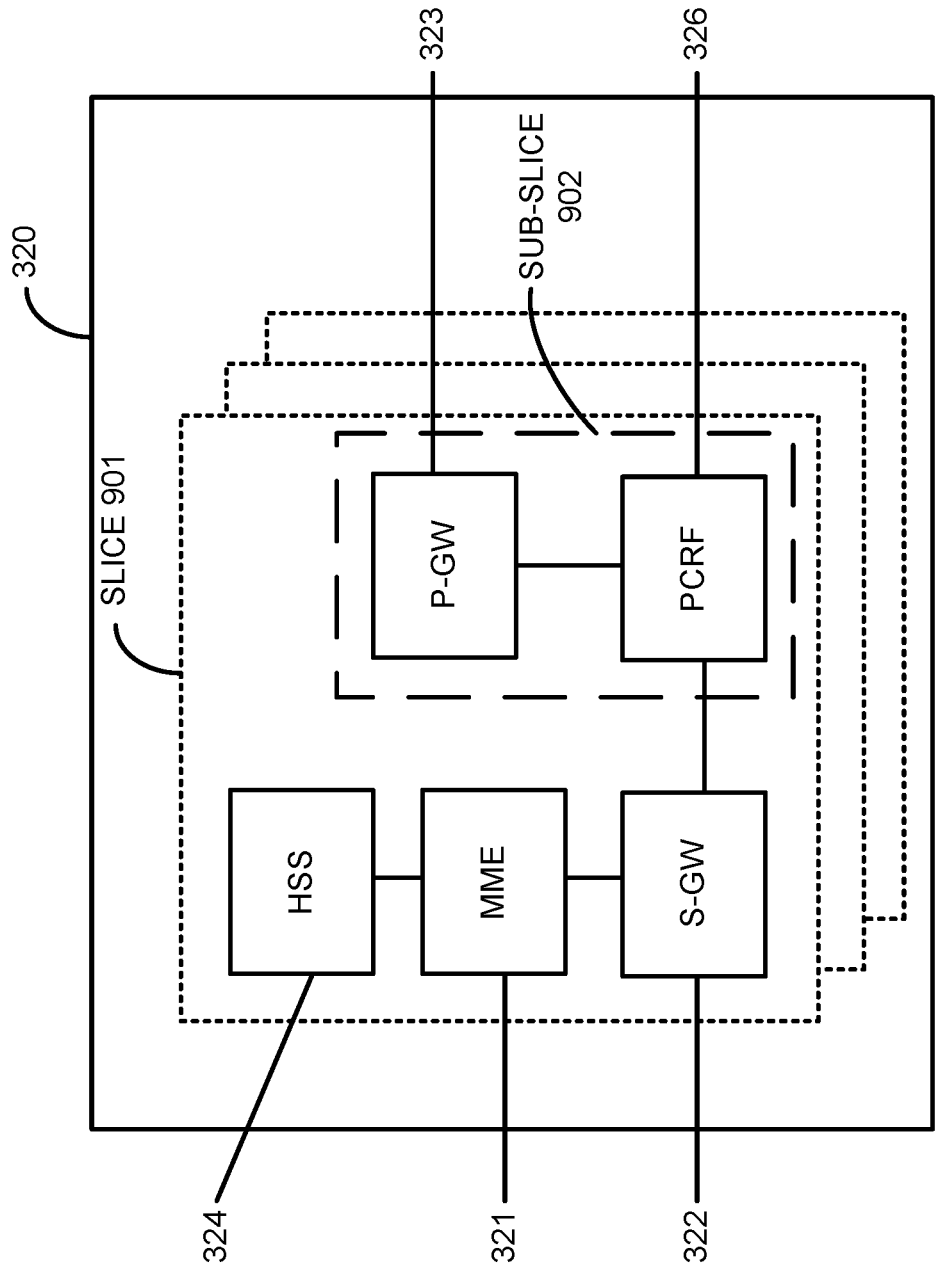
FIG. 9 illustrates components of a core network in accordance with various embodiments.

FIG. 9 illustrates components of a core network in accordance with various embodiments. The components of the CN 320 may be implemented in one physical node or separate physical nodes including components to read and execute instructions from a machine-readable or computer-readable medium (e.g., a non-transitory machine-readable storage medium). In embodiments, the components of CN 420 may be implemented in a same or similar manner as discussed herein with regard to the components of CN 320. In some embodiments, NFV is utilized to virtualize any or all of the above-described network node functions via executable instructions stored in one or more computer-readable storage mediums (described in further detail below). A logical instantiation of the CN 320 may be referred to as a network slice 901, and individual logical instantiations of the CN 320 may provide specific network capabilities and network characteristics. A logical instantiation of a portion of the CN 320 may be referred to as a network sub-slice 902 (e.g., the network sub-slice 902 is shown to include the P-GW 323 and the PCRF 326).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 4), a network slice often comprises a RAN part and a CN part. The support of network slicing relies on the principle that traffic for different slices is handled by different PDU sessions. The network can realize the different network slices by scheduling and also by providing different L1/L2 configurations. The UE 401 provides assistance information for network slice selection in an appropriate RRC message, if it has been provided by NAS. While the network can support large number of slices, the UE need not support more than 8 slices simultaneously.

A network slice may include the CN 420 control plane and user plane NFs, NG-RANs 410 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 401 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 421 instance serving an individual UE 401 may belong to each of the network slice instances serving that UE.

Network Slicing in the NG-RAN 410 involves RAN slice awareness. RAN slice awareness includes differentiated handling of traffic for different network slices, which have been pre-configured. Slice awareness in the NG-RAN 410 is introduced at the PDU session level by indicating the S-NSSAI corresponding to a PDU session in all signaling that includes PDU session resource information. How the NG-RAN 410 supports the slice enabling in terms of NG-RAN functions (e.g., the set of network functions that comprise each slice) is implementation dependent. The NG-RAN 410 selects the RAN part of the network slice using assistance information provided by the UE 401 or the 5GC 420, which unambiguously identifies one or more of the pre-configured network slices in the PLMN. The NG-RAN 410 also supports resource management and policy enforcement between slices as per SLAs. A single NG-RAN node may support multiple slices, and the NG-RAN 410 may also apply an appropriate RRM policy for the SLA in place to each supported slice. The NG-RAN 410 may also support QoS differentiation within a slice.

The NG-RAN 410 may also use the UE assistance information for the selection of an AMF 421 during an initial attach, if available. The NG-RAN 410 uses the assistance information for routing the initial NAS to an AMF 421. If the NG-RAN 410 is unable to select an AMF 421 using the assistance information, or the UE 401 does not provide any such information, the NG-RAN 410 sends the NAS signaling to a default AMF 421, which may be among a pool of AMFs 421. For subsequent accesses, the UE 401 provides a temp ID, which is assigned to the UE 401 by the 5GC 420, to enable the NG-RAN 410 to route the NAS message to the appropriate AMF 421 as long as the temp ID is valid. The NG-RAN 410 is aware of, and can reach, the AMF 421 that is associated with the temp ID. Otherwise, the method for initial attach applies.

The NG-RAN 410 supports resource isolation between slices. NG-RAN 410 resource isolation may be achieved by means of RRM policies and protection mechanisms that should avoid that shortage of shared resources if one slice breaks the service level agreement for another slice. In some implementations, it is possible to fully dedicate NG-RAN 410 resources to a certain slice. How NG-RAN 410 supports resource isolation is implementation dependent.

Some slices may be available only in part of the network. Awareness in the NG-RAN 410 of the slices supported in the cells of its neighbors may be beneficial for inter-frequency mobility in connected mode. The slice availability may not change within the UE's registration area. The NG-RAN 410 and the 5GC 420 are responsible to handle a service request for a slice that may or may not be available in a given area. Admission or rejection of access to a slice may depend on factors such as support for the slice, availability of resources, support of the requested service by NG-RAN 410.

The UE 401 may be associated with multiple network slices simultaneously. In case the UE 401 is associated with multiple slices simultaneously, only one signaling connection is maintained, and for intra-frequency cell reselection, the UE 401 tries to camp on the best cell. For inter-frequency cell reselection, dedicated priorities can be used to control the frequency on which the UE 401 camps. The 5GC 420 is to validate that the UE 401 has the rights to access a network slice. Prior to receiving an Initial Context Setup Request message, the NG-RAN 410 may be allowed to apply some provisional/local policies, based on awareness of a particular slice that the UE 401 is requesting to access. During the initial context setup, the NG-RAN 410 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
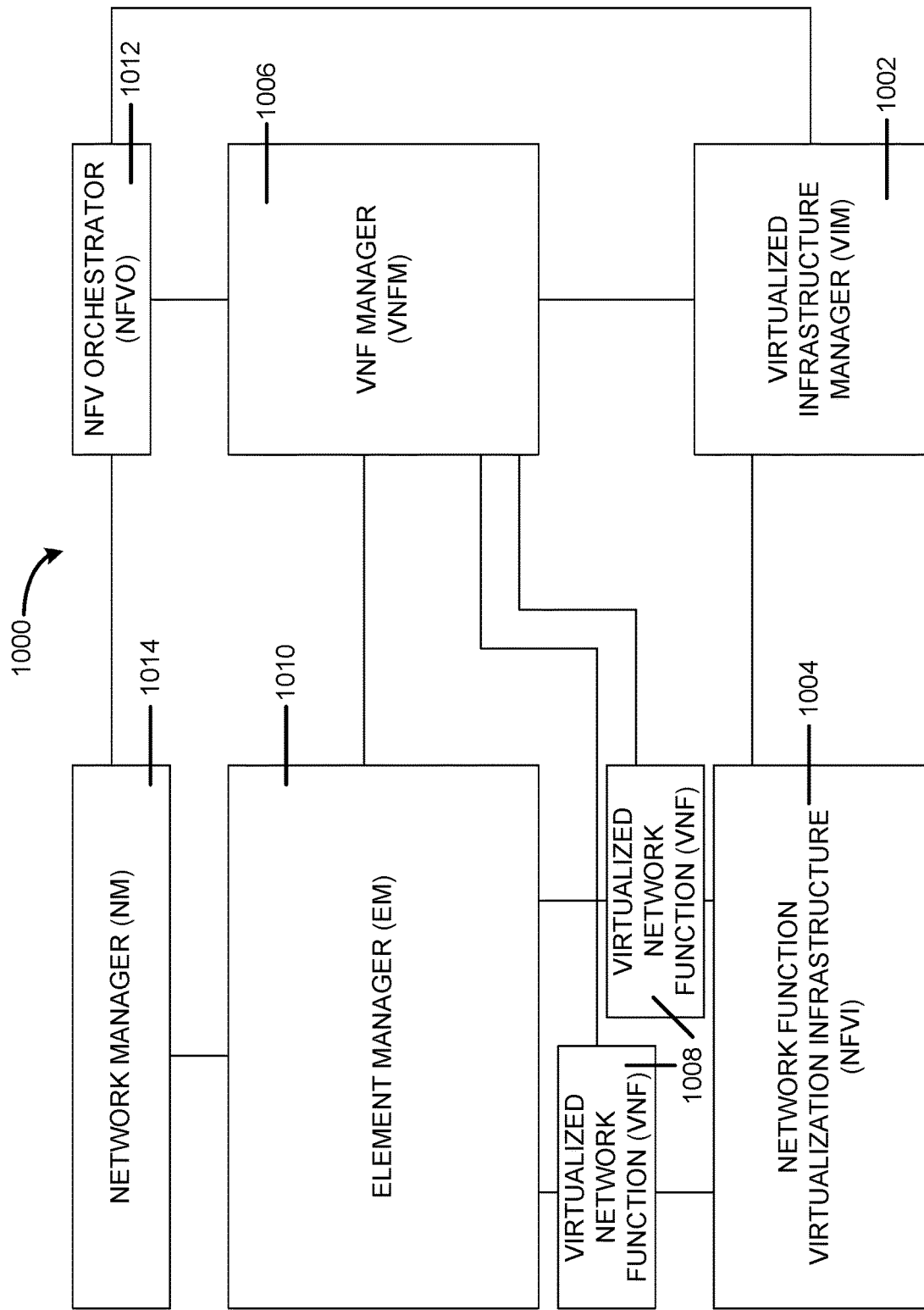
FIG. 10 illustrates components of a system to support NFV in accordance with one or more embodiments.

FIG. 10 is a block diagram illustrating components, according to some example embodiments, of a system 1000 to support NFV. The system 1000 is illustrated as including a VIM 1002, an NFVI 1004, an VNFM 1006, VNFs 1008, an EM 1010, an NFVO 1012, and a NM 1014.

The VIM 1002 manages the resources of the NFVI 1004. The NFVI 1004 can include physical or virtual resources and applications (including hypervisors) used to execute the system 1000. The VIM 1002 may manage the life cycle of virtual resources with the NFVI 1004 (e.g., creation, maintenance, and tear down of VMs associated with one or more physical resources), track VM instances, track performance, fault and security of VM instances and associated physical resources, and expose VM instances and associated physical resources to other management systems.

The VNFM 1006 may manage the VNFs 1008. The VNFs 1008 may be used to execute EPC components/functions. The VNFM 1006 may manage the life cycle of the VNFs 1008 and track performance, fault and security of the virtual aspects of VNFs 1008. The EM 1010 may track the performance, fault and security of the functional aspects of VNFs 1008. The tracking data from the VNFM 1006 and the EM 1010 may comprise, for example, PM data used by the VIM 1002 or the NFVI 1004. Both the VNFM 1006 and the EM 1010 can scale up/down the quantity of VNFs of the system 1000.

The NFVO 1012 may coordinate, authorize, release and engage resources of the NFVI 1004 in order to provide the requested service (e.g., to execute an EPC function, component, or slice). The NM 1014 may provide a package of end-user functions with the responsibility for the management of a network, which may include network elements with VNFs, non-virtualized network functions, or both (management of the VNFs may occur via the EM 1010).

Figure 11:
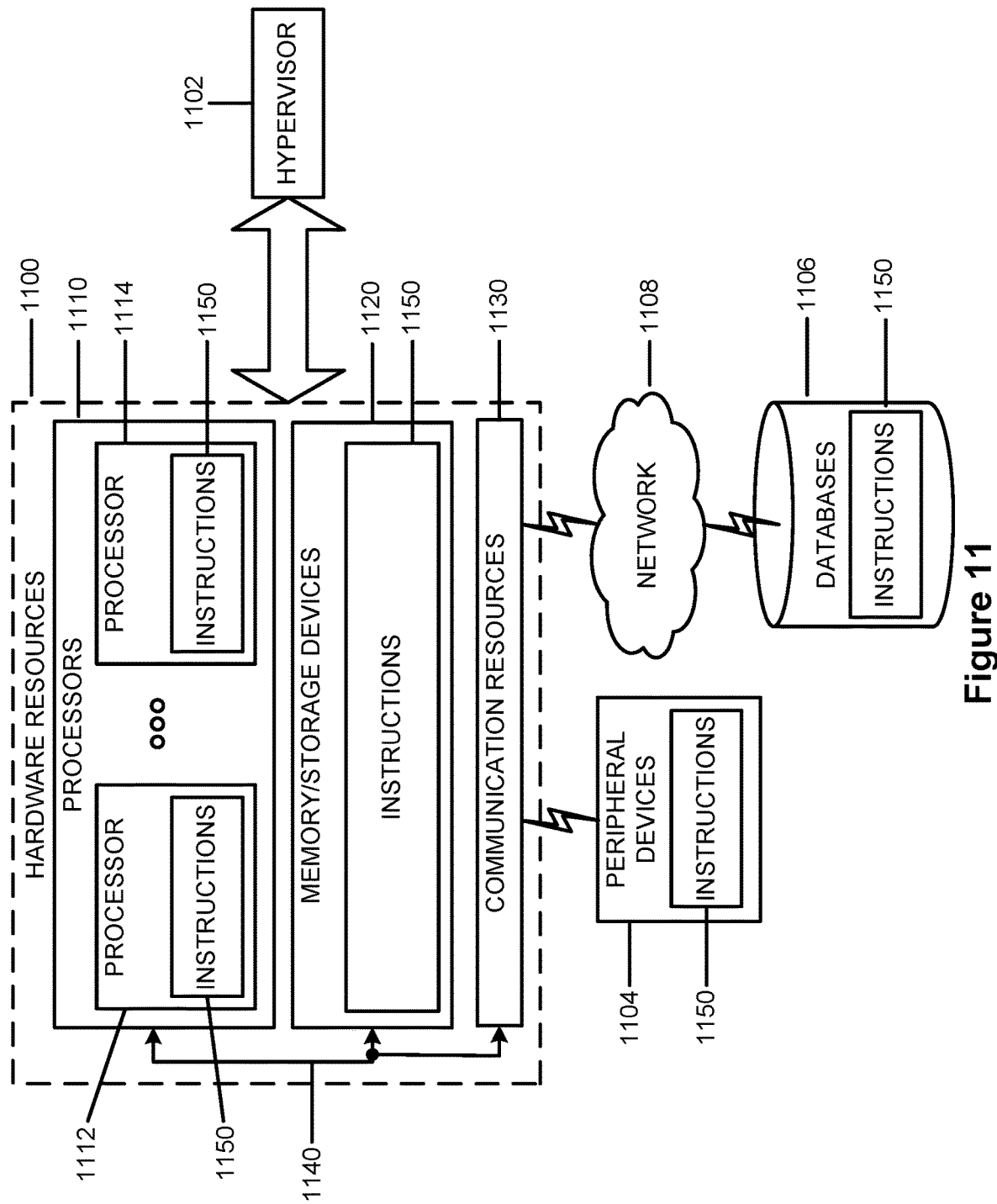
FIG. 11 illustrates example components able to read instructions from a machine-readable or computer-readable medium.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processor(s) 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via USB), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

Figure 12:
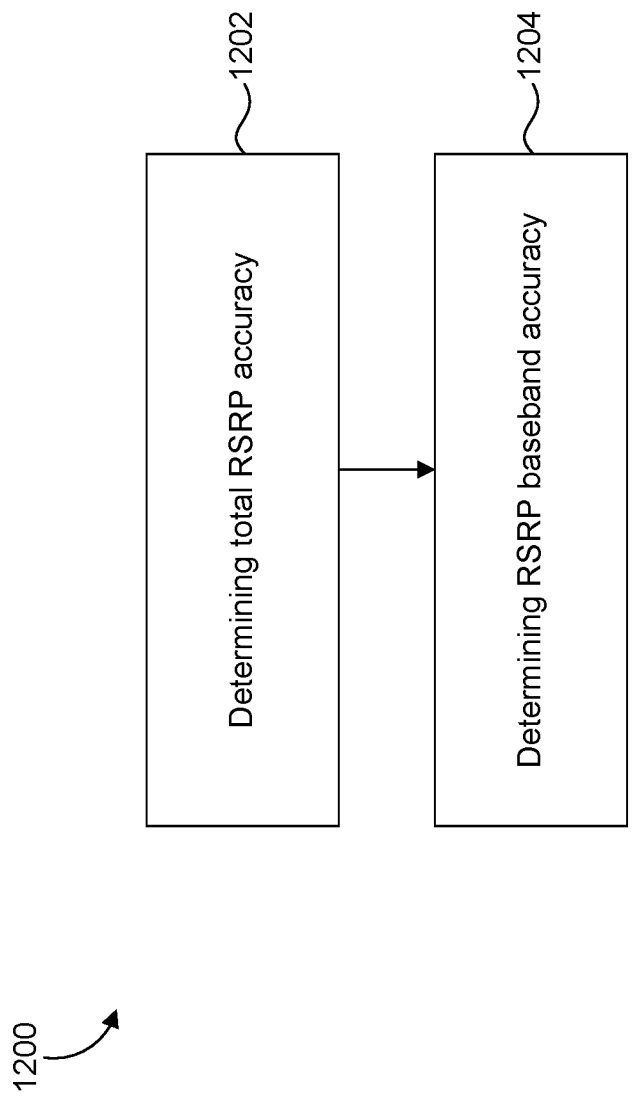
FIGS. 12 and 13 illustrate flowcharts in accordance with one or more embodiments.

In some embodiments, the electronic device(s), network (s), system(s), chip(s) or component(s), or portions or implementations thereof, of FIGS. 2-11, or some other figure herein, may be configured to perform one or more processes, techniques, or methods as described herein, or portions thereof. One such process of performing a 2-part NR RSRP OTA test is depicted in FIG. 12. For example, the process 1200 may include, at 1202, determining a total RSRP accuracy. The process may further include, at 1204, determining an RSRP baseband accuracy. In some embodiments, the process may further include determining that a UE passes a measurement accuracy test if both the total RSRP accuracy and the RSRP baseband accuracy pass (for example, meet or exceed predetermined thresholds) simultaneously.

In some embodiments, test equipment acting as a gNB may generate signals that are transmitted to the tested UE. The signals transmitted to the UE may be a useful signal with the ideal RSPR value. The UE may measure the RSRP after beamforming and report back to the test equipment. The test equipment may calculate the RSRP delta and determine whether the UE passes or not.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method comprising: performing a two-part NR RSRP measurement accuracy test.

Example 2 may include the method of example 1 or some other example herein, wherein said performing the two-part NR RSRP measurement accuracy test is based on one or more OTA signals.

Example 3 may include the method of example 1 or some other example herein, wherein a first part of the two-part NR RSRP measurement accuracy test includes: measuring total RSRP accuracy including RF related loss.

Example 4 may include the method of example 3 or some other example herein, wherein measuring the total RSRP accuracy comprises: determining an ideal RSRP at reference point A before beamforming; determining a measured RSRP at reference point B after beamforming; and determining a delta RSRP based on the measured RSRP and the ideal RSRP.

Example 5 may include the method of example 4 or some other example herein, wherein the UE will report the ideal RSRP at reference point A or the measured RSRP at reference point B to test equipment.

Example 6 may include the method of example 4 or some other example herein, wherein the method is performed by test equipment and further comprises determining the ideal RSRP at reference point A and determining the measured RSRP at reference point B based on the feedback collected from the user equipment.

Example 7 may include the method of example 3 or some example herein, wherein a second part of the two-part NR RSRP measurement accuracy test comprises measuring an RSRP baseband accuracy.

Example 8 may include the method of example 7 or some other example herein, wherein measuring the RSRP baseband accuracy comprises: calculating an ideal RSRP at reference point B after beamforming; and calculating a measured RSRP at reference point B after beamforming, wherein reference signal and artificial noise is sent out from Tx side simultaneously.

Example 9 may include the method of example 8 or some other example herein, further comprising determining RSRP delta based on the ideal RSRP and the measured RSRP calculated during the second part.

Example 10 may include the method of example 1 or some other example herein, further comprising determining the UE passes the two-step NR RSRP measurement accuracy test if both of the two-parts pass simultaneously.

Example 11 may include a method of testing a UE, the method comprising: sending one or more OTA signals to the UE; receiving feedback from the UE; and performing a two-part NR RSRP measurement accuracy test based on the feedback received from the UE.

Example 12 may include the method of example 11 or some other example herein, wherein a first part of the two-part NR RSRP measurement accuracy test comprises: determining a total RSRP accuracy measurement that includes RF-related loss.

Example 13 may include the method of example 12 or some other example herein, wherein determining the total RSRP accuracy measurement includes: determining, based on the feedback from the UE, an ideal RSRP at reference point A before beamforming; determining, based on the feedback from the UE, a measured RSRP at reference point B after beamforming; and determining a delta RSRP based on the measured RSRP and the ideal RSRP.

Example 14 may include the method of example 11 or some other example herein, wherein a second part of the two-part NR RSRP measurement accuracy test comprises: determining an RSRP baseband accuracy.

Example 15 may include the method of example 14 or some other example herein, wherein determining the RSRP baseband accuracy comprises: sending a reference signal with high power; and determining, based on the feedback, a calculation of an ideal RSRP at reference point B after beamforming, the calculation of the ideal RSRP based on the reference signal sent with high power.

Example 16 may include the method of example 15 or some other example herein, wherein determining the RSRP baseband accuracy further comprises: simultaneously sending reference signal and artificial noise; and determining, based on the feedback, a calculation of a measured RSRP at reference point B after beamforming, the calculation of the measured RSRP based on the simultaneous sending of the reference signal and artificial noise.

Example 17 may include the method of example 11 or some other example herein, wherein performing the two-part NR RSRP measurement accuracy test comprises: determining a total RSRP accuracy measurement; comparing the total RSRP accuracy measurement to a first threshold; determining an RSRP baseband accuracy; comparing the RSRP baseband accuracy to a second threshold; and determining whether the UE passes the two-part NR RSRP measurement accuracy test based on said comparing of the total RSRP accuracy measurement to the first threshold and said comparing of the RSRP baseband accuracy to the second threshold.

Example 18 may include an apparatus comprising means to perform one or more elements of a method described in or related to any of examples 1-17, or any other method or process described herein.

Example 19 may include one or more non-transitory computer-readable media comprising instructions to cause an electronic device, upon execution of the instructions by one or more processors of the electronic device, to perform one or more elements of a method described in or related to any of examples 1-17, or any other method or process described herein.

Example 20 may include an apparatus comprising logic, modules, or circuitry to perform one or more elements of a method described in or related to any of examples 1-17, or any other method or process described herein.

Example 21 may include a method, technique, or process as described in or related to any of examples 1-17, or portions or parts thereof.

Example 22 may include an apparatus comprising: one or more processors and one or more computer-readable media comprising instructions that, when executed by the one or more processors, cause the one or more processors to perform the method, techniques, or process as described in or related to any of examples 1-17, or portions thereof.

Example 23 may include a signal as described in or related to any of examples 1-17, or portions or parts thereof.

Example 24 may include a signal in a wireless network as shown and described herein.

Example 25 may include a method of communicating in a wireless network as shown and described herein.

Example 26 may include a system for providing wireless communication as shown and described herein.

Example 27 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Figure 13:
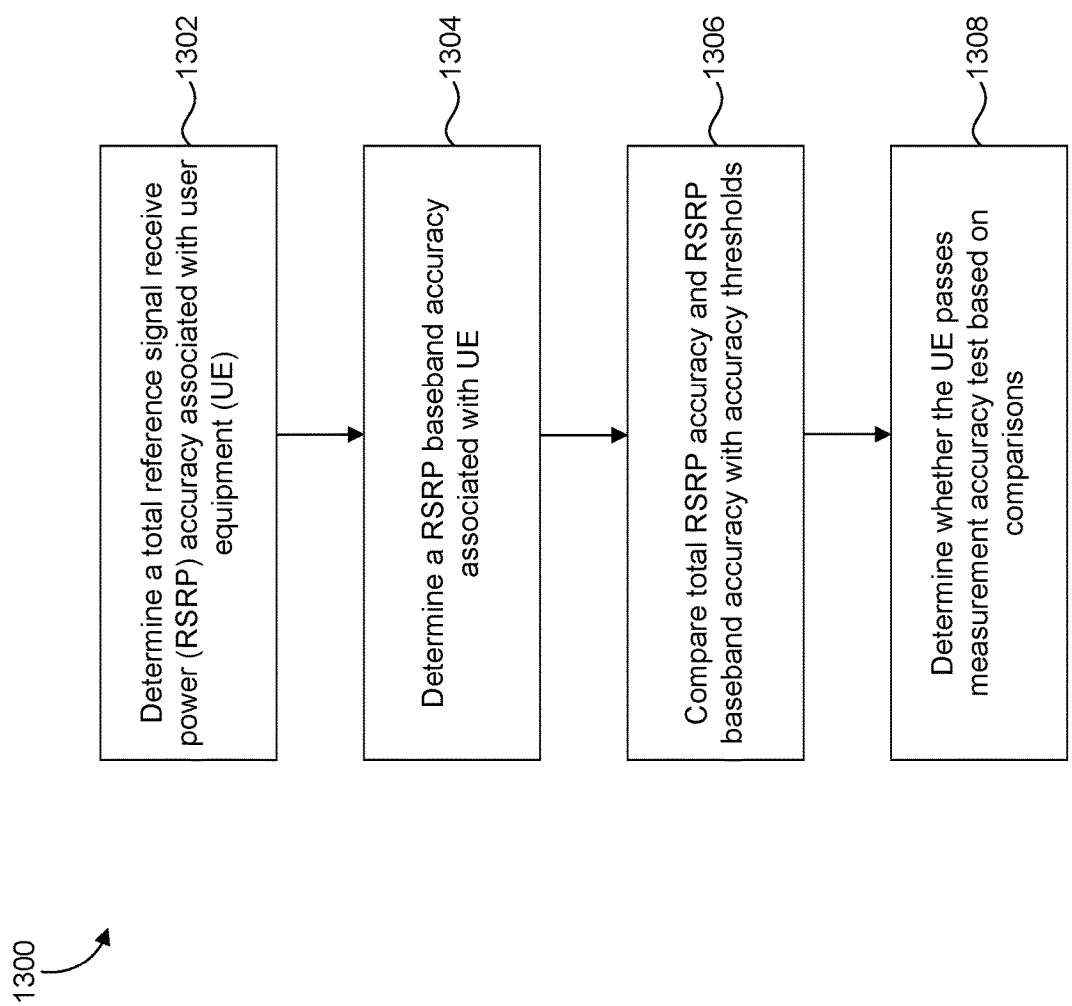

FIG. 13 illustrates a flowchart in accordance with one or more embodiments. The process (1300) depicted in FIG. 13 may be executed by one or more of the components discussed above in reference to FIGS. 2-11; including application circuitry 505, baseband circuitry 510, application circuitry 805, PHY 810, and processors 1114. One or more steps in FIG. 13 may be performed by UE. One or more steps in FIG. 13 may be performed by test equipment. In one or more embodiments, one or more of the steps shown in FIG. 13 may be omitted, repeated, and/or performed in a different order than the order shown in FIG. 13. Accordingly, the scope should not be considered limited to the specific arrangement of steps shown in FIG. 13. The steps shown in FIG. 13 may be implemented as computer-readable instructions stored on computer-readable media, where, when the instructions are executed, cause a processor to perform the process of FIG. 13. Additionally or alternatively, the steps shown in FIG. 13 can be implemented in a processor that is hard-coded or processor circuitry, including a state machine performing particular logic functions.

In step 1302, a total reference signal receive power (RSRP) accuracy associated with the UE is determined. This might include determining an ideal RSRP at a first reference point before beamforming, determining a measured RSRP at a second reference point after beamforming, and calculating a delta RSRP based on the ideal and measured RSRP. If step 1302 is being performed by test equipment, the total RSRP accuracy may be determined based on feedback signals from the UE that are generated in response to transmitting OTA signals to the UE. The feedback signals may include the ideal and measured RSRP. Additional details regarding determining the total RSRP accuracy are disclosed above (e.g., in the examples and figures discussed above).

In step 1304, an RSRP baseband accuracy associated with the UE is determined. This might include determining an ideal RSRP for a first received reference signal after beamforming the first received reference signal, determining a measured RSRP for a second received reference signal after beamforming the second received reference signal, and calculating a delta RSRP based on the ideal and measured RSRP. The first reference signal and the second reference signal may have matching (i.e., equal or approximately equal) power levels. The second reference signal may also have artificial noise. If step 1304 is being performed by test equipment, the RSRP baseband accuracy may be determined based on feedback signals from the UE that are generated in response to transmitting OTA signals to the UE. The feedback signals may include the ideal and measured RSRP. The OTA signals may include the first and second reference signals and may be transmitted by the test equipment.

Additional details regarding determining RSRP baseband accuracy are disclosed above (e.g., in the examples and figures discussed above).

In Step 1306, the total RSRP accuracy and the RSRP baseband accuracy are compared with a first accuracy threshold and a second accuracy threshold, respectively. Additional details regarding the comparisons are disclosed above (e.g., in the examples and figures discussed above).

In Step 1308, it is determined whether the UE passes a measurement accuracy test based on the comparisons. For example, if both the RSRP accuracy and the RSRP baseband accuracy simultaneously satisfy (e.g., fall below) their respective accuracy thresholds, the UE is deemed to be accurate and thus any RSRP measurement taken by the UE is also deemed to be accurate. An indication of the measurement accuracy test result (e.g., pass, fail) may be sent to the UE.

Abbreviations

For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |

-continued

| | |
|---|---|
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | distributed gNB-distributed unit, Next Generation NodeB unit |
| GNSS | Global Navigation Satellite System |
| GPRS | General Packet Radio Service |
| GSM | Global System for Mobile Communications, Groupe Special Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO, HO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| K | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |

| | |
|---|---|
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | 'Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit—type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |

| | |
|---|---|
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Service Discovery Protocol (Bluetooth related) |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block, SS/PBCH Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |

-continued

| | |
|---|---|
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel"

may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A non-transitory computer-readable medium (CRM) comprising instructions that, when executed by one or more processors, cause the one or more processors to:
determine a total reference signal receive power (RSRP) accuracy associated with a user equipment (UE) configured to operate on a wireless cellular network;
determine a RSRP baseband accuracy associated with the UE;
execute a first comparison between the total RSRP accuracy and a first accuracy threshold and a second comparison between the RSRP baseband accuracy and a second accuracy threshold that is different from the first accuracy threshold; and
determine whether the UE passes a measurement accuracy test based on the first comparison and the second comparison.

2. The non-transitory CRM of claim 1, wherein to determine whether the UE passes the measurement accuracy test comprises determining whether the total RSRP accuracy is less than the first accuracy threshold and the RSRP baseband accuracy is less than the second accuracy threshold.

3. The non-transitory CRM of claim 1, wherein to determine the total RSRP accuracy comprises:
determining an ideal RSRP at a first reference point in the UE before beamforming;
determining a measured RSRP at a second reference point in the UE after beamforming; and
calculating a delta RSRP based on the ideal RSRP and the measured RSRP, wherein the total RSRP accuracy comprises the delta RSRP.

4. The non-transitory CRM of claim 1, wherein to determine the RSRP baseband accuracy comprises:
receiving a first reference signal with a first power level;
determining an ideal RSRP for the first reference signal after beamforming the first reference signal;
receiving a second reference signal comprising artificial noise and a second power level matching the first power level;
determining a measured RSRP for the second signal after beamforming the second reference signal; and
calculating a delta RSRP based on the ideal RSRP and the measured RSRP, wherein the RSRP baseband accuracy comprises the delta RSRP.

5. The non-transitory CRM of claim 4, wherein the first reference signal has a carrier signal in excess of 5 GHz.

6. The non-transitory CRM of claim 4, wherein the measured RSRP comprises artificial noise power corresponding to the artificial noise and a thermal noise power.

7. The non-transitory CRM of claim 1, wherein the one or more processors are located in the UE.

8. A system, comprising:
radio front end circuitry; and
processor circuitry, coupled to the radio front end circuitry, the processor circuitry configured to:
transmit one or more over the air (OTA) signals to a user equipment (UE) configured to operate on a wireless cellular network;
receive feedback from the UE based on the one or more OTA signals;
determine a total reference signal receive power (RSRP) accuracy associated with the UE based on the feedback;
determine an RSRP baseband accuracy associated with the UE based on the feedback;
execute a first comparison between the total RSRP accuracy and a first accuracy threshold and a second comparison between the RSRP baseband accuracy and a second accuracy threshold that is different from the first accuracy threshold; and
determine whether the UE passes a measurement accuracy test based on the first comparison and the second comparison.

9. The system of claim 8, wherein to determine whether the UE passes the measurement accuracy test comprises determining whether the total RSRP accuracy is less than the first accuracy threshold and the RSRP baseband accuracy is less than the second accuracy threshold.

10. The system of claim 8, wherein to determine the total RSRP accuracy comprises:
determining an ideal RSRP at a first reference point in the UE before beamforming;
determining a measured RSRP at a second reference point in the UE after beamforming; and
calculating a delta RSRP based on the ideal RSRP and the measured RSRP, wherein the total RSRP accuracy comprises the delta RSRP.

11. The system of claim 8, wherein to determine the RSRP baseband accuracy comprises:
determining an ideal RSRP for a first reference signal after beamforming the first reference signal, wherein the first reference signal is transmitted to the UE by test equipment;
determining a measured RSRP for a second reference signal after beamforming the second reference signal, wherein the second reference signal is transmitted to the UE by the test equipment and comprises artificial noise and a second power level matching a first power level; and calculating a delta RSRP based on the ideal RSRP and the measured RSRP, wherein the RSRP baseband accuracy comprises the delta RSRP, and wherein the one or more OTA signals comprise the first reference signal and the second reference signal.

12. The system of claim 11, wherein the first reference signal has a carrier signal in excess of 5 GHz.

13. The system of claim 11, wherein the measured RSRP comprises artificial noise power corresponding to the artificial noise and a thermal noise power.

14. The system of claim 11, wherein the processor circuitry is located in the test equipment.

15. A method, comprising:
determining a total reference signal receive power (RSRP) accuracy associated with a user equipment (UE) configured to operate in a wireless cellular network;

determining an RSRP baseband accuracy associated with the UE;

executing a first comparison between the total RSRP accuracy and a first accuracy threshold and a second comparison between the RSRP baseband accuracy and a second accuracy threshold that is different from the first accuracy threshold; and determining whether the UE passes a measurement accuracy test based on the first comparison and the second comparison.

16. The method of claim 15, wherein determining whether the UE passes the measurement accuracy test comprises determining whether the total RSRP accuracy is less than the first accuracy threshold and the RSRP baseband accuracy is less than the second accuracy threshold.

17. The method of claim 15, wherein determining the total RSRP accuracy comprises:
determining an ideal RSRP at a first reference point in the UE before beamforming;

determining a measured RSRP at a second reference point in the UE after beamforming; and calculating a delta RSRP based on the ideal RSRP and the measured RSRP, wherein the total RSRP accuracy comprises the delta RSRP.

18. The method of claim 15, wherein determining the RSRP baseband accuracy comprises:
determining an ideal RSRP for a first reference signal after beamforming the first reference signal, wherein the first reference signal is transmitted to the UE by test equipment;

determining a measured RSRP for a second reference signal after beamforming the second reference signal, wherein the second reference signal is transmitted to the UE by the test equipment and comprises artificial noise and a second power level matching a first power level; and calculating a delta RSRP based on the ideal RSRP and the measured RSRP, wherein the RSRP baseband accuracy comprises the delta RSRP, wherein one or more over the air (OTA) signals comprise the first reference signal and the second reference signal.

19. The method of claim 18, wherein the first reference signal has a carrier signal in excess of 5 GHz.

20. The method of claim 18, wherein the measured RSRP comprises artificial noise power corresponding to the artificial noise and a thermal noise power.

* * * * *

UNITED STATES PATENT AND TRADEMARK OFFICE
CERTIFICATE OF CORRECTION

| | | |
|---|---|---|
| PATENT NO. | : 12,063,537 B2 | Page 1 of 1 |
| APPLICATION NO. | : 17/430023 | |
| DATED | : August 13, 2024 | |
| INVENTOR(S) | : Li et al. | |

It is certified that error appears in the above-identified patent and that said Letters Patent is hereby corrected as shown below:

In the Specification

In Column 15, Line 10, delete "SLAB" and insert -- SLAs --, therefor.

In Column 19, Line 41, delete "(MRAIVI)," and insert -- (MRAM), --, therefor.

In Column 23, Line 3, delete "IMUS" and insert -- IMUs --, therefor.

In Column 24, Line 54, delete "RRC Idle" and insert -- RRC_Idle --, therefor.

In Column 49, Line 23, delete "SI-MIME" and insert -- SI-MME --, therefor.

In the Claims

In Column 55, Claim 1, Line 47, delete "a RSRP" and insert -- an RSRP --, therefor.

Signed and Sealed this
Twenty-second Day of April, 2025

Coke Morgan Stewart
*Acting Director of the United States Patent and Trademark Office*